United States Patent
Schneier et al.

(10) Patent No.: US 7,524,245 B2
(45) Date of Patent: *Apr. 28, 2009

(54) SYSTEM AND METHOD FOR SECURING ELECTRONIC GAMES

(75) Inventors: Bruce Schneier, Minneapolis, MN (US); Jay S. Walker, Ridgefield, CT (US); James A. Jorasch, Stamford, CT (US); Geoffrey M. Gelman, Stamford, CT (US)

(73) Assignee: Walker Digital, LLC, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 11/934,856

(22) Filed: Nov. 5, 2007

(65) Prior Publication Data

US 2008/0064494 A1 Mar. 13, 2008

Related U.S. Application Data

(63) Continuation of application No. 10/246,099, filed on Sep. 17, 2002, now abandoned, which is a continuation-in-part of application No. 09/895,648, filed on Jun. 29, 2001, now Pat. No. 6,450,885, which is a continuation of application No. 09/488,608, filed on Jan. 20, 2000, now Pat. No. 6,264,557, which is a continuation of application No. 08/775,588, filed on Dec. 31, 1996, now Pat. No. 6,099,408.

(51) Int. Cl.
*A63F 13/00* (2006.01)
*A63F 9/24* (2006.01)
*G06F 17/00* (2006.01)
*G06F 19/00* (2006.01)

(52) U.S. Cl. .............................. 463/29; 463/16; 463/22; 463/42

(58) Field of Classification Search ............. 463/10–13, 463/16, 17, 22, 25, 29, 40–42
See application file for complete search history.

(56) References Cited

U.S. PATENT DOCUMENTS

| | | |
|---|---|---|
| 3,548,174 A | 12/1970 | Knuth |
| 4,200,770 A | 4/1980 | Hellman |
| 4,218,582 A | 8/1980 | Hellman et al. |
| 4,339,134 A | 7/1982 | Macheel |
| 4,652,998 A | 3/1987 | Koza et al. |
| 4,759,064 A | 7/1988 | Chaum |
| 4,897,875 A | 1/1990 | Pollard et al. |
| 4,998,199 A | 3/1991 | Tashiro et al. |
| 5,136,642 A | 8/1992 | Kawamura et al. |
| 5,242,163 A | 9/1993 | Fulton et al. |
| 5,251,165 A | 10/1993 | James, III |

(Continued)

OTHER PUBLICATIONS

Welcome to Global Games Online! Global Games Corporation, undated, 5 pp.

(Continued)

*Primary Examiner*—Dmitry Suhol
*Assistant Examiner*—Binh-An D Nguyen

(57) ABSTRACT

A game server is provided, the game server comprising a processor and a storage device coupled to the processor. The storage device stores instructions adapted to be executed by the processor to perform a method comprising: generating a first signal; transmitting an encoded first signal; receiving a second signal; and transmitting a decoding key after receiving the second signal.

74 Claims, 25 Drawing Sheets

U.S. PATENT DOCUMENTS

| | | | |
|---|---|---|---|
| 5,269,521 | A | 12/1993 | Rossides |
| 5,317,637 | A | 5/1994 | Pichlmaier et al. |
| 5,324,035 | A | 6/1994 | Morris et al. |
| 5,326,104 | A | 7/1994 | Pease et al. |
| 5,356,144 | A | 10/1994 | Fitzpatrick et al. |
| 5,377,271 | A | 12/1994 | Foreman et al. |
| 5,397,133 | A | 3/1995 | Penzias |
| 5,398,932 | A | 3/1995 | Eberhardt et al. |
| 5,473,689 | A | 12/1995 | Eberhard |
| 5,474,294 | A | 12/1995 | Sandeen |
| 5,477,037 | A | 12/1995 | Berger |
| 5,507,489 | A | 4/1996 | Reibel |
| 5,511,784 | A | 4/1996 | Furry |
| 5,557,518 | A | 9/1996 | Rosen |
| 5,564,701 | A | 10/1996 | Dettor |
| 5,605,504 | A | 2/1997 | Huang |
| 5,643,086 | A | 7/1997 | Alcorn et al. |
| 5,661,806 | A | 8/1997 | Nevoux et al. |
| 5,707,286 | A | 1/1998 | Carlson |
| 5,772,509 | A | 6/1998 | Weiss |
| 5,779,545 | A * | 7/1998 | Berg et al. ............... 463/22 |
| 5,846,131 | A | 12/1998 | Kitahara |
| 5,917,725 | A * | 6/1999 | Thacher et al. ............ 700/91 |
| 5,970,143 | A * | 10/1999 | Schneier et al. ............ 713/181 |
| 6,048,269 | A * | 4/2000 | Burns et al. ............... 463/25 |
| 6,099,408 | A * | 8/2000 | Schneier et al. ............ 463/29 |
| 6,264,557 | B1 * | 7/2001 | Schneier et al. ............ 463/29 |
| 6,428,413 | B1 | 8/2002 | Carlson |
| 6,450,885 | B2 * | 9/2002 | Schneier et al. ............ 463/29 |
| 6,986,055 | B2 | 1/2006 | Carlson |

OTHER PUBLICATIONS

Fujitsu Develops Random Number Generator HEMT IC, COMLINE Daily New Electronics, Feb. 15, 1990, 1 pg.

Swan, Tom "The chip-is-bad fever; random-number generators; Algorithm Alley", Dr. Dobb's Journal of Software Tools, Jan. 1994, 4 pp.

Levine, Joshua. "How'd you like to get paid to hear an ad every time you make a phone call?", Forbes, Jan. 3, 1994, 2 pp.

Furturistic Advertising, The Commercial Appeal, Jan. 15, 1994, 1 pg.

Bachman, Katy, "Interactive doesn't have to be super star wars"; Direct Marketing; Are we ready for the next Mellenium? Cowles Business Media, Jun. 1994, 4 pp.

Jaffee, Larry, "FreeFone Network Expands Service; Novel interactive advertising medium targets phone customers", DM News, Jun. 6, 1994, 2 pp.

Chaitin, Gregory J., "Randomness and Mathematical Proof, Scientific America", May 1975, 9 pp.

Federal Way Washington, Company's Online Casino Software May Be Risky In America, Copywright 1996, 2 pp.

Capstone Chip Technology, hrttp: bilbo isu.edu security isl cap.html download date: Oct. 10, 1996, 2 pp.

Carl, Jeremy, "Online Casinos: Drawing to a Tough Hand", Sep. 5, 1996, 5 pp.

From Obscurity to the World's Largest Casino Using the Internet, www.casino.org casinol htm, Feb. 1996, 41 pp.

Moni Naor: "Bit Commitment Using Pseudo-Randomness", Advances in Cryptology, 9 pp.

Blum, M., "Coin Flipping by telephone", IEEE COMPCON Digest Conference, 1982, 4 pp.

Schneier, Bruce, Applied Cryptography: Protocols, Algorithms, and Source Code in C, 2nd Edition, 1996, 7 pp.

Encyclopedia of Computer Science, 3rd Edition, Anthony Ralston and Edwin D. Reilly editors, 7 pp.

International Search Report for PCT/US97/23977 dated Jul. 20, 1998, 3 pp.

Written Opinion for PCT/US97/23977 dated Mar. 23, 1999, 5 pp.

Office Action for U.S. Appl. No. 08/775,588 mailed Oct. 6, 1998, 8 pp.

Office Action for U.S. Appl. No. 08/775,588 mailed Jun. 22, 1999, 8 pp.

Notice of Allowability for U.S. Appl. No. 08/775,588 mailed Oct. 25, 1999, 1 pg.

Office Action for U.S. Appl. No. 09/488,608 mailed Oct. 3, 2000, 4 pp.

Notice of Allowability for U.S. Appl. No. 09/488,608 mailed Feb. 9, 2001, 3 pp.

Office Action for U.S. Appl. No. 09/895,648 mailed Dec. 18, 2001, 5 pp.

Notice of Allowability for U.S. Appl. No. 09/895,648 mailed Apr. 21, 2002, 3 pp.

Office Action for European Application No. 97 952 659.7, 9 pp.

Office Action for Canadian Application No. 2,276,608 mailed Jul. 14, 2003, 4 pp.

Notice of Allowance for Canadian Application No. 2,276,608 mailed Sep. 16, 2004, 1 pg.

Office Action for Australian Application No. 97372/01 mailed Feb. 25, 2003, 2 pp.

Notice of Acceptance for Australian Application No. 97372/01 mailed Mar. 9, 2004, 3 pp.

Office Action for Australian Application No. 56219/98 mailed Aug. 29, 2000, 2 pp.

Notice of Acceptance for Australian Application No. 56219/98 mailed May 11, 2001, 2 pp.

* cited by examiner

| PLAYER ID NUMBER 261 | TRACKING NUMBER 262 | GAME SELECTED 263 | AMOUNT OF WAGER 264 | TIME OF WAGER 266 | TYPE OF WAGER 267 | GAME RESULT 268 |
|---|---|---|---|---|---|---|
| GB45921 | 4032XF | ROULETTE | $5.00 | 5:10 PM 05/07/97 | FIFTEEN RED | WIN $5.00 |
| HT21990 | 9724MR | BLACKJACK | $10.00 | 3:30 AM 05/08/97 | TWO HANDS | LOSE $10.00 |
| DL44087 | 8322PK | BLACKJACK | $15.00 | 3:35 AM 05/08/97 | ONE HAND | WIN $15.00 |

| PLAYER ID NUMBER 261 | SELECTION DATA TRACKING NUMBER 262 | GAME RESULT 268 | RESULT VALUE 269 | TIME OF RESULT 271 | PAYMENT STATUS 272 |
|---|---|---|---|---|---|
| GB45921 | 4032XF | WIN $5.00 | 34 | 5:15 PM 05/07/97 | PAYMENT COMPLETED |
| HT21990 | 9724MR | LOSE $10.00 | 234 | 3:32 AM 05/08/97 | PAYMENT DUE |
| DL44087 | 8322PK | WIN $15.00 | 876 | 3:37 AM 05/08/97 | AMOUNT UPDATED |

SYSTEM AND METHOD FOR SECURING ELECTRONIC GAMES

The present application is a continuation of U.S. patent application Ser. No. 10/246,099, filed Sep. 17, 2002, now abandoned entitled "SYSTEM AND METHOD FOR SECURING ELECTRONIC GAMES"; which is a continuation-in-part application of U.S. patent application Ser. No. 09/895,648, filed Jun. 29, 2001, and which issued as U.S. Pat. No. 6,450,885; which is a continuation of U.S. patent application Ser. No. 09/488,608 filed Jan. 20, 2000, and which issued as U.S. Pat. No. 6,264,557; which is a continuation of U.S. patent application Ser. No. 08/775,588 filed Dec. 31, 1996, and which issued as U.S. Pat. No. 6,099,408. Each of the above-referenced applications is incorporated by reference herein its entirety.

FIELD OF INVENTION

The present invention relates to electronic games, and particularly to methods and devices for securing and ensuring the randomness of electronic or online games.

BACKGROUND OF THE INVENTION

Various forms of electronic games of chance have been available for many years. The way these games are played, however, is changing dramatically with the use of digital computers operating on electronic networks such as the Internet. Players can now connect to a remote server and wager electronically.

Rather than traveling to a casino, a player can log into an electronic game and wager from the comforts of his own home. While this remote playing has many advantages, it raises several security issues. For example, when playing card games at a casino, a player can observe the dealer shuffle and deal the cards and thus has some confidence that the outcome was generated randomly. In an electronic casino, the shuffling process is typically digitally generated, driven by random number generators which the player cannot see. The player cannot know whether the random number generated is truly random or was selected by the casino to give it an advantage.

Electronic game providers have tried to increase players' confidence in the legitimacy of games by assuring players that gaming software has not been tampered with. For example, an electronic game provider may allow an independent third party to perform an audit of the software. This is a time-consuming and expensive process, however. With complex software running into the hundreds of thousands of lines of code, it is very difficult to find a few lines of code that alter the randomness of the outcomes.

Some electronic lottery systems have subscribed to methods for securing communications between remote player terminals and a central controller. U.S. Pat. No. 4,652,998 to Koza, for example, describes cryptographic methods for securing these communications. In games dependent on the use of random numbers, however, simply securing the transmission of a fraudulent random number does not solve the problems inherent in the prior art.

Although there are many patents which describe the generation of random numbers, such as U.S. Pat. No. 3,548,174 to Knuth, they describe only methods for improving the statistical performance of random number generators.

BRIEF DESCRIPTION OF THE DRAWINGS

The accompanying drawings, which are incorporated in and constitute a part of this specification, illustrate several embodiments of the invention and together with the general description given above and the detailed description given below, serve to explain the principles of the invention.

FIGS. 2A and 2B are block diagrams showing exemplary database configurations.

FIGS. 11 through 13A are flow charts illustrating various exemplary procedures for exchanging random numbers in which a player terminal generates a hash value of a random number.

DETAILED DESCRIPTION OF THE INVENTION

Figure 1:
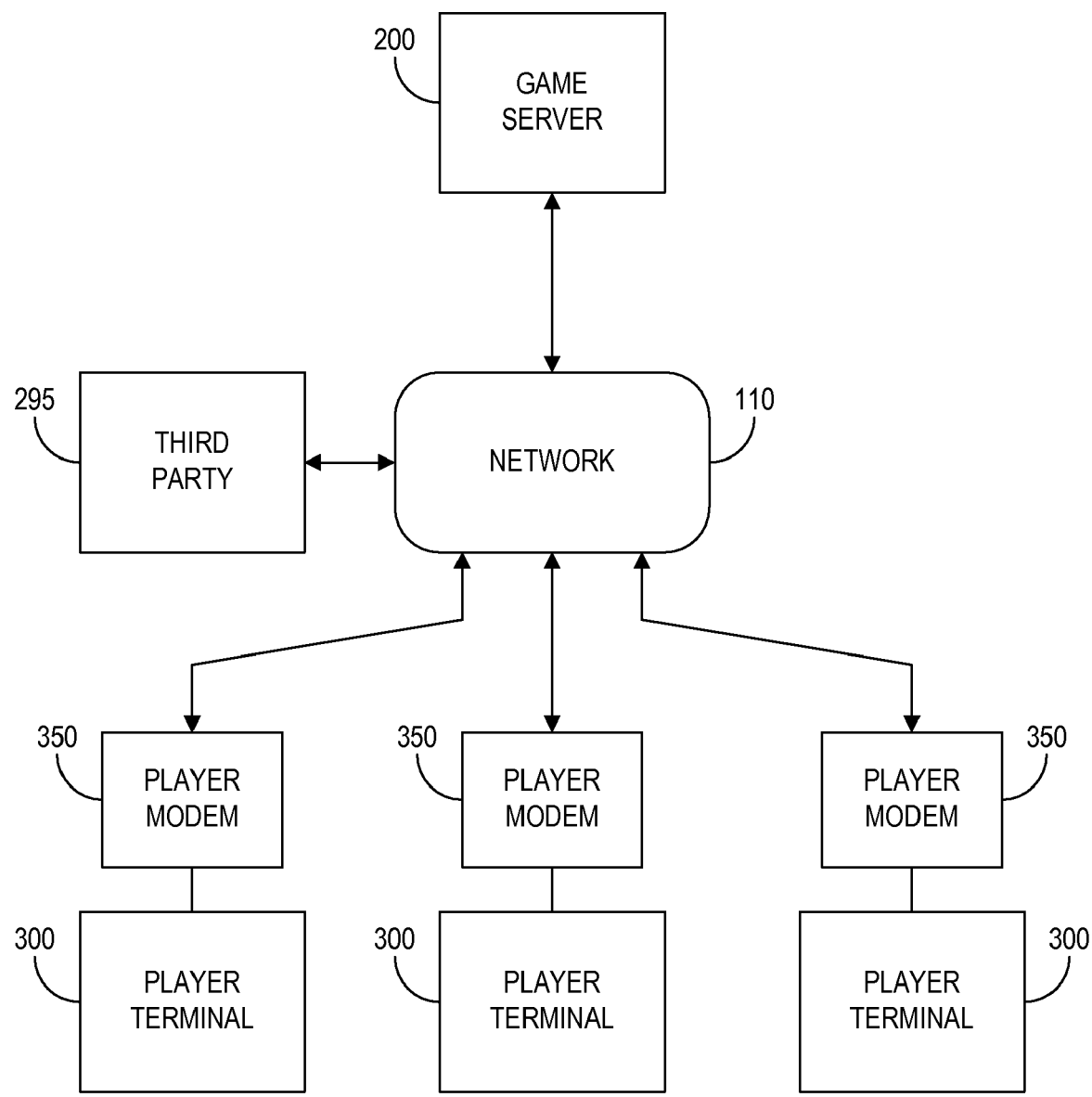
FIG. 1 is a block diagram of an electronic game system in accordance with some embodiments of the present invention.

FIG. 1 illustrates the basic system components of one or more embodiments of the present invention. Generally, the system comprises game server 200 and multiple player terminals 300, each with an associated player modem 350. Game server 200 preferably is in communication with the player terminal modems 350 via an Internet connection using a network 110, such as a Public Switched Telephone Network ("PSTN"). Alternatively, communication may take place via dedicated data lines, cellular, Personal Communication Systems ("PCS"), microwave, satellite networks, or any other form of data communications path.

Optionally, game server 200 and/or one or more player terminals 300 may be in communication with a third party 295. Receiving and/or transmitting of various types of information may take place via the optional third party 295, as described in detail below.

Any number of gaming devices and/or optional third parties may be in communication with the server 200. The number of each depicted in FIG. 1 is solely for purposes of illustration.

Figure 2:
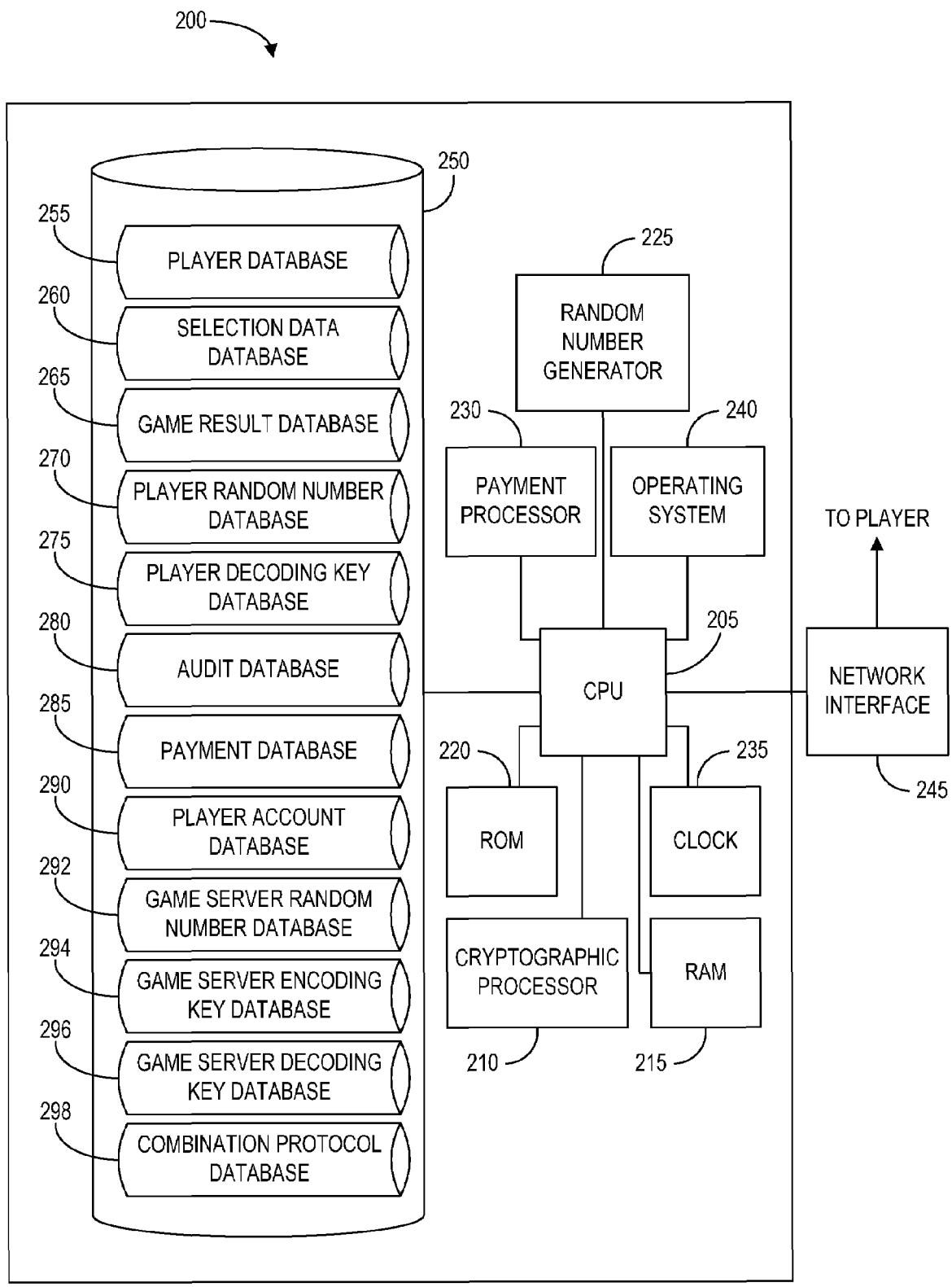
FIG. 2 is a block diagram showing some embodiments of a game server.

FIG. 2 illustrates the basic hardware and data structures of game server 200 in accordance with one or more embodiments of the present invention. Game server 200 includes central processor ("CPU") 205, cryptographic processor 210, random access memory ("RAM") 215, read-only memory ("ROM") 220, random number generator 225, payment processor 230, clock 235, operating system 240 (typically residing in memory as software), network interface 245, and data storage device 250. These elements are connected appropriately, for example, by a standard system bus, so as to allow communications among them.

Game server 200 is preferably capable of high volume transaction processing, performing a significant number of mathematical calculations and processing communications and database searches. In one or more embodiments, game server 200 comprises a conventional personal computer or computer workstation with sufficient memory and processing capability to perform the disclosed functionality. A processor such as the 1.8 GHZ Pentium® 4, commonly manufactured by Intel Inc., may be used for CPU 205. In other embodiments, game server 200 operates as a Web server, both transmitting and receiving communications to and from player terminals 300.

Cryptographic processor 210 supports the encoding and decoding of communications with players, as well as the authentication of players. An MC68HC16 microcontroller, commonly manufactured by Motorola Inc., may be used for cryptographic processor 210. This microcontroller utilizes a 16-bit multiply-and-accumulate instruction in the 16 MHZ configuration and requires less than one second to perform a 512-bit private key operation. Other exemplary commercially available specialized cryptographic processors include VLSI Technology's 33 MHz 6868 or Semaphore Communications' 40 MHZ Roadrunner 284. Alternatively cryptographic processor 210 may be configured as part of CPU 205.

As used herein, encoding and decoding refer to any method of disguising and revealing a message or signal, respectively. These methods include the use of key-based algorithms, codes, steganography, substitution ciphers, transposition ciphers, one-time pads, hash functions, and so on, including various combinations of any such techniques. For a more complete list of encoding and decoding techniques, see Bruce Schneier, *Applied Cryptography: Protocols, Algorithms, and Source Code in C*, (2$^{nd}$ ed., John Wiley & Sons, Inc., 1996). Cryptographic processor, 210, may support any of these techniques. A conventional random number generating processor may be used for random number generator 225. The HEMT integrated circuit manufactured by Fujitsu, for example, is capable of generating over one billion random numbers per second. Alternatively, random number generator 225 may be incorporated into CPU 205.

Payment processor 230 supports the transfer and exchange of payments, charges, or debits. Functions performed by payment processor 230 include the preparation of on-line account statements, order-taking, credit card payment authorization, credit card settlement, automated sales tax calculations, digital receipt generation, account-based purchase tracking, and payment aggregation for low-priced services. Processing of credit card transactions by payment processor 230 may be supported with commercially available software, such as the Secure Webserver manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Payment processor 230 preferably comprises a microprocessor (such as the Intel Pentium® 4), but alternatively may be configured as part of CPU 205.

Data storage device 250 may include hard disk, magnetic, or optical storage units, as well as CD-ROM drives or flash memory. Data storage device 250 contains databases used in the processing of transactions in the present invention, including player database 255, player selection data database 260, game result database 265, player random number database 270, player decoding key database 275, audit database 280, payment database 285, player account database 290, game server random number database 292, game server encoding key database 294, game server decoding key database 296, and combination protocol database 298. In a preferred embodiment, database software such as Oracle9i™, manufactured by Oracle Corporation, is used to create and manage these databases.

For illustration purposes, FIG. 2A provides a structural diagram of an exemplary player selection data database 260. As shown, selection data database 260 maintains data on selections made by a player, and includes fields for saving player ID number 261, tracking number 262, game selected 263, amount of wager 264, time of wager 266, type of wager 267, and a game result 268.

FIG. 2B illustrates another example of a database, this time, the game result database 265. As shown, game result database 265 tracks the results associated with each set of player selection data and includes fields for the player ID number 261, selection data tracking number 262, game result 268, result value 269, time of result 271, and status of payment 272.

The meaning of the information in these various fields will become more clear in the following descriptions. The other databases are organized in a similar manner, thus separate figures of each are not necessary. Player database 255 maintains data on players, and includes fields such as name, address, credit card number, phone number, ID number, social security number, electronic mail address, past system usage, public/private key information, and game preferences. This information is preferably obtained when the player first registers with the system. Player database 255 also contains the tracking number of each player selection data and player random number generated by a player.

Player random number database 270 stores all player random numbers. This database is indexed by player ID and contains fields such as player ID number, corresponding selection data tracking number, tracking number of a corresponding player decoding key, a player random number, and the time at which the player random number was received by game server 200.

Player decoding key database 275 facilitates the decoding of the player random number, storing the keys necessary to decode communications from a player. For messages encrypted using a public key encryption system such as RSA, Data Security Inc.'s player public keys will be stored in player decoding key database 275. In a symmetric key cryptographic system such as Data Encryption System ("DES"), symmetric keys are stored. Both symmetric and public keys are long strings of binary digits, and are explained more fully below with respect to cryptographic authentication embodiments.

Audit database 280 stores transactional information relating to a player and, in one or more embodiments, includes the time and date of each player log in, and the number of games played.

Payment database 285 tracks all payments made by the players with fields such as player name, player ID number, amount of payment, and corresponding player selection data and a game result. This database may also store credit card numbers of players or bank account information.

Player account database 290 may be established if the player wants to keep a balance of finds at game server 200 for future transactions. Player account database 290 acts as a checking account, with winnings deposited and losing wagers subtracted. Alternatively, this account may be a pointer to account data stored at the player's bank, storing only the name of the bank and the player's bank account number.

Game server random number database 292 tracks all game server random numbers generated by game server 200 and, in one or more embodiments, includes fields such as corresponding player selection data tracking number, player name, player ID number, the time that game server random number was generated, and the time that the game server random number was transmitted to the player.

Game server encoding key database 294 stores all encoding keys used by game server 200 to encode the game server random number.

Game server decoding key database 296 stores all decoding keys transmitted to player terminal 300 to decode the game server random numbers.

Finally, combination protocol database 298 stores the protocols used to combine a player random number with a game server random number to form a result value.

Referring again to FIG. 2, network interface 245 is the gateway to communicate with players through respective player terminals 300. Conventional internal or external modems may serve as network interface 245. Network interface 245 preferably supports modems at a range of baud rates from 1200 upward, but may combine such inputs into a T1 or T3 line if more bandwidth is required. In a preferred embodiment, network interface 245 is connected to the Internet and/or a commercial on-line service such as America Online, CompuServe, or Prodigy, allowing players access to game server 200 from a wide range of electronic connections. Several commercial electronic mail servers include the above functionality. For example, NCD Software manufactures "Post. Office," a secure server-based electronic mail software package designed to link people and information over enterprise networks and the Internet. This product is platform independent and utilizes open standards based on Internet protocols. Users can exchange messages with enclosures such as files, graphics, video, and audio. This product also supports multiple languages. Alternatively, network interface 245 may be configured as a voice-mail interface, web site, electronic Bulletin Board System ("BBS"), or electronic-mail address.

While the above embodiment describes a single computer acting as game server 200, those skilled in the art will realize that the functionality can be distributed over a plurality of computers, wherein the databases and processors are housed in separate units or locations. Some controllers perform the primary processing functions and contain, at a minimum, RAM, ROM, and a general processor. Each of these controllers is attached to a WAN hub which serves as the primary communication link with the other controllers and terminals. The WAN hub may have minimal processing capability itself, serving primarily as a communications router. Those skilled in the art will appreciate that an almost unlimited number of controllers may be supported.

Figure 3:
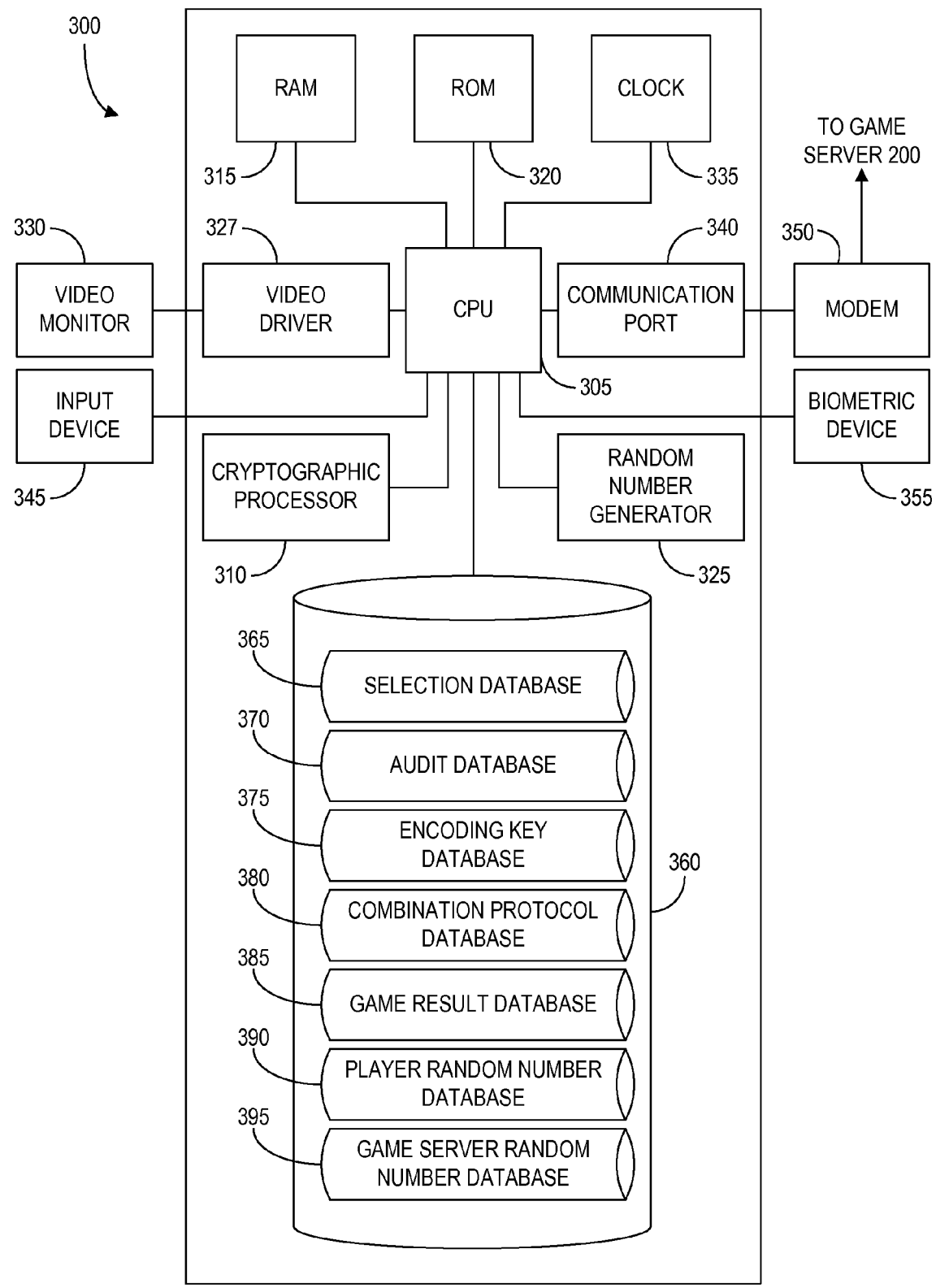
FIG. 3 is a block diagram showing some embodiments of a player terminal.

FIG. 3 illustrates the basic hardware and data structures of a player terminal in accordance with a preferred embodiment of the invention. Player terminal 300 preferably includes central processor (CPU) 305, cryptographic processor 310, RAM 315, ROM 320, random number generator 325, video driver 327, video monitor 330, clock 335, communication port 340, input device 345, modem 350, and data storage device 360. Biometric device 355 may be added for increased security, as described below with respect to cryptographic authentication embodiments. A processor such as the 1.8 GHZ Pentium® 4 described above may be used for CPU 305. A conventional random number generating processor such as the HEMT integrated circuit described above may be used for random number generator 325. Alternatively, random number generator 325 may be incorporated into CPU 305. Clock 335 is a standard chip-based clock which can serve to time stamp transactions between player terminal 300 and game server 200.

In an exemplary embodiment, player terminal 300 is a conventional personal computer having an input device, such as a keyboard, mouse, or conventional voice recognition software package. Player terminal 300 would thus interface with game server 200 via modem 350. Alternatively, player terminal 300 may be a voice-mail system, or other electronic or voice communications system. Devices such as fax machines or pagers are also suitable terminal devices.

Modem 350 may not require high-speed data transfer if most player selection data and player random numbers are text-based and not too long. For cryptographic processor 310, the MC68HC16 microcontroller described above may be used. The structure of biometric device 355 will be described in conjunction with the cryptographic authentication embodiment.

Data storage device 360 preferably comprises a conventional magnetic-based hard disk storage unit such as those manufactured by Seagate. Selection data database 365 records all selection data generated by a player, tracking games selected, type of bet, amount of wager, etc. Audit database 370 stores communications between player terminal 300 and game server 200. Encoding key database 375 stores keys used in the process of encoding communications transmitted to game server 200. Combination protocol database 380 stores the protocols used by game server 200 to combine a player random number and a game server random number. Game result database 385 stores all of the players' results, including amounts won or lost. Player random number database 390 stores each random number generated by a player. Game server random number database 395 stores all game server random numbers received from game server 200. This database may also store the corresponding decoding keys in the event that a game server random number is encoded.

Player terminal 300 communications are preferably software driven. There are many commercial software applications that can enable the communications required by player terminal 300, the primary functionality being message creation and transmission. Eudora Pro manufactured by Qualcomm Incorporated, for example, provides editing tools for the creation of messages as well as the communications tools to route the message to the appropriate electronic address. When game server 200 is configured as a Web server, conventional communications software, such as the Internet Explorer™ Web browser from Microsoft Corporation may also be used. The player may use the Internet Explorer™ browser to transmit and receive random numbers and selections.

Having described the system and component architecture, we will now consider various embodiments of the present invention to ensure the integrity of electronic games.

As discussed, in one or more embodiments of the present invention, communications between player terminal 300 and game server 200 take place via one or more electronic networks, preferably with game server 200 acting as a Web server.

Figure 4:
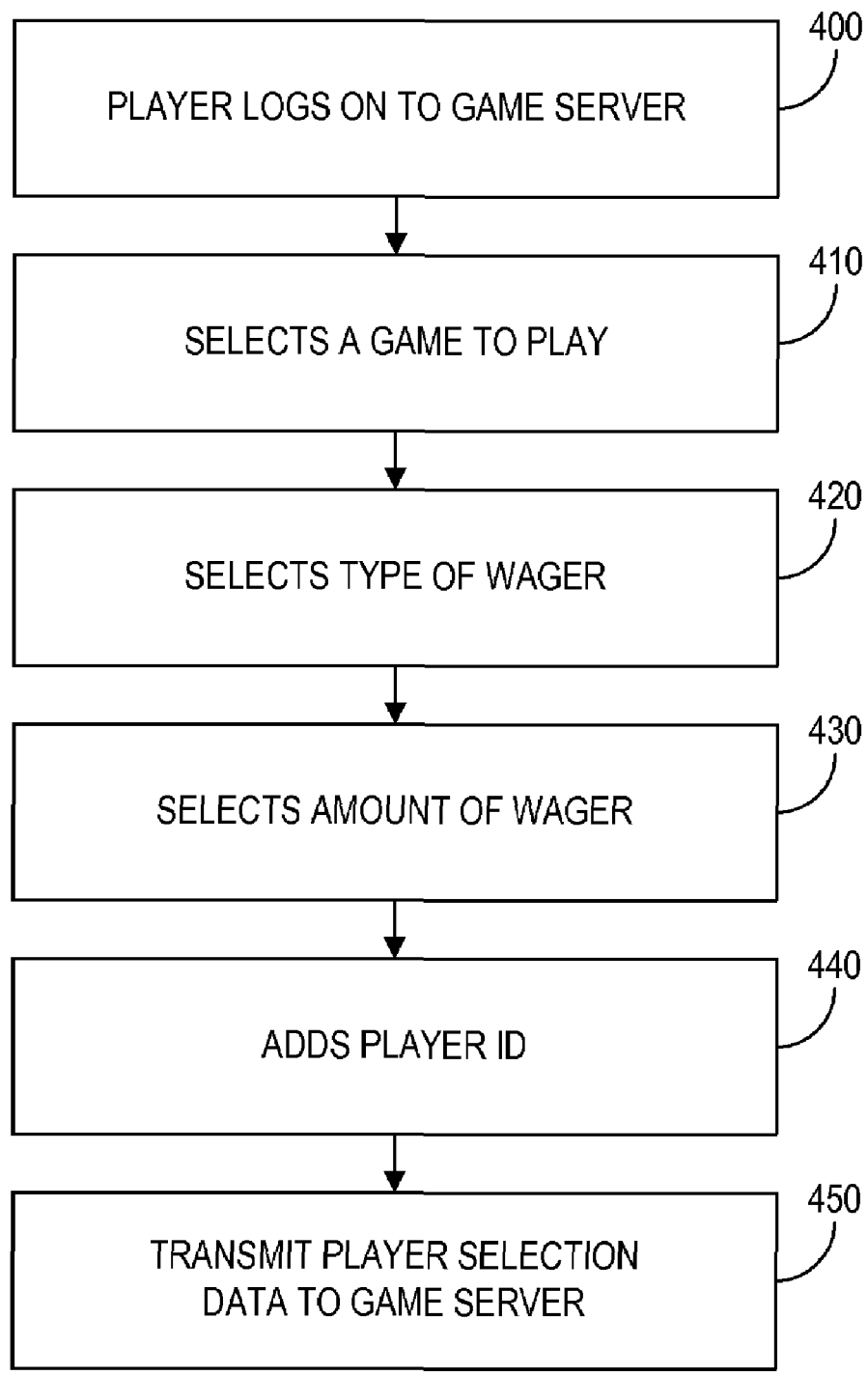
FIG. 4 is a flow chart illustrating an exemplary process by which a player transmits a selection to a game server.

FIG. 4 illustrates a process by which a player transmits a player selection to a game server. Initially, a player logs on to game server 200 using player modem 350 of player terminal 300, establishing a communication link at step 400. At step 410, the player selects the game that he wants to play by selecting from a list of possible games. The player may, for example, select a potential game from a list on a Web page by clicking on the appropriate icon or graphic. Games preferably include casino games such as blackjack, craps, roulette, baccarat, slot machines, lottery, poker, video poker, and sports betting, but may include any game in which a first party (e.g., a server) generates a random number that must be trusted by a second party (e.g., player), including raffles and prize drawings.

There are many types of games having a random component that are not typically considered casino games or "games of chance." For example, many board games, such as Scrabble™ or Monopoly™, as well as card games, such as Bridge or Hearts, may typically be considered "games of skill" or non-casino games. Many such games, however, have an element of randomness, such as a dice roll, a selection of letters, a shuffled deck of cards, and/or a deal of cards. Thus, any game in which one party generates a random number that must be trusted by another party may be provided for in accordance with various embodiments of the present invention.

After the game is selected, the player selects a type of wager at step 420. The type of wager is directly related to the game selected. The type of wager for a roulette game might be, for example, a bet on "even", or a single number bet such as "18 black." For a game like blackjack, the type of wager would indicate the number of simultaneous hands the player intends to play.

At step 430, the player then selects the amount of each wager. For example, the player might bet one hundred dollars on the next blackjack hand, or may bet five dollars on the next pull of a slot machine. The player may elect to use funds from player account database 290 or may transmit payment information such as a credit card number along with the total amount wagered. At step 440, the player attaches his name or a unique player ID number to his selections, allowing game server 200 to authenticate the identity of the player This ID number is preferably received from game server 200 when the player registers with the service or is chosen by the player and then registered with game server 200 by phone. As shown in FIG. 2A, game server 200 maintains a database of player ID numbers in player database 255 and issues (or allows) only unique numbers. If less security is required, the player's telephone number could serve as the ID number since it has the advantages of being both unique and easily remembered. If additional security is required, procedures such as those described below with respect to cryptographic authentication embodiments may be implemented.

At step 450, all of the data provided by the player is combined to form "selection data" which is transmitted to game server 200. Game server 200 then receives the player selection data and adds a tracking number before storing it in selection data database 260.

Instead of a World Wide Web-based interface, players may also transmit the selection data via electronic-mail, voice-mail, or facsimile transmissions. With voice-mail, the player calls game server 200 and leaves selection data in audio form. Selection data is then transcribed into digital text at game server 200 by a conventional audio-to-text transcriber, not shown. As described, game server 200 supports a plurality of transmission methods, allowing for a wide variety of formats of selection data.

The selection data need not include each of a type of game, a type of wager, and the amount of a wager. In some embodiments, a type of wager and/or an amount to wager may be stored at the game server as player preferences, for example, in player database 255. For example, the player may only need to indicate a type of game in the selection data, and the game server may look up the player's preferences for type of wager and/or amount of wager in player database 255 based on the type of game. Of course, some types of games may be offered that do not require the player to make a wager at all. In some embodiments, the type of game preferred by the player may be associated with the player as a preference, for example, in player database 255. Accordingly, in one or more embodiments of the present invention, the player selection data may not include a type of game, a type of wager and/or a wager amount.

Figure 5:
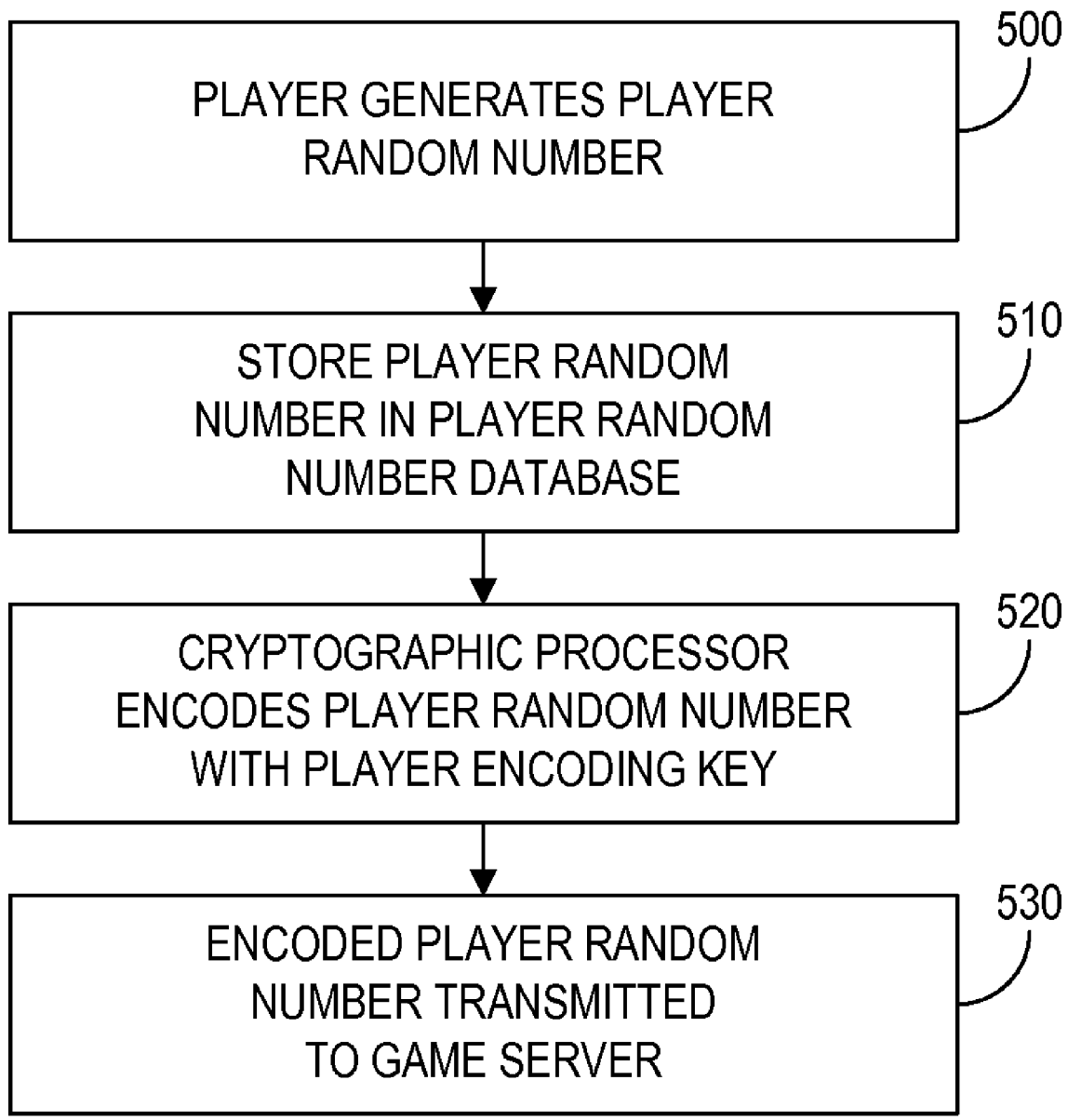
FIG. 5 is a flow chart showing an exemplary process by which a player generates and encodes a random number.

FIG. 5 illustrates a process by which a player generates and encodes a random number for use by the game server 200. At step 500, the player generates a player random number either by selecting a number himself or prompting random number generator 225 of player terminal 300 to produce the number. Although this number is preferably random, the system works equally well with any number that cannot be predicted by game server 200. Random number generator 225 may incorporate external factors, such as the time between keystrokes of the player, or the current position of a computer mouse. At step 510, player terminal 300 stores the player random number in player random number database 390. At step 520, cryptographic processor 310 encodes the player random number using an encoding key from encoding key database 375. Because each player random number preferably uses a unique encoding key, encoding key database 375 preferably contains either a large number of unique keys or generates new encoding keys in real-time. Various methods for encoding numbers are known in the art and need not be described here in detail. For reference, one of ordinary skill in the art may refer to Bruce Schneier, *Applied Cryptography: Protocols, Algorithms, and Source Code in C,* ($2^{nd}$ ed., John Wiley & Sons, Inc., 1996).

As noted above, a number transmitted by one party to another for use in a combination protocol need not be a random number, but may be any number that cannot be predicted (or cannot be predicted easily) by the other party. It will also be understood that the data transmitted for use in a combination protocol may be any signal, data, or information that is unlikely to be predicted by the other party. Such signals may include, without limitation, one or more numbers, random numbers, letters, alphanumeric characters, audio signals, video signals, algorithms, or any combination of such information. Any such signals may be selected by the party directly (e.g., a process for selecting a signal need not include any randomness). Although various embodiments are described herein as relating to random numbers, it will be understood that the various embodiments may employ any of the signals described herein.

Along with an encoded player random number, the player appends his player ID number and the tracking number (see FIG. 2A) to the corresponding selection data so that game server 200 knows to which wager the player random number should apply. This information is then transmitted to game server 200 using player modem 350 at step 530. In order to authenticate the player's identity, game server 200 extracts the player ID number from the message containing the encoded player random number and looks up the player's identity in player database 255. If further authentication is desired, the protocols of the authentication embodiments discussed below may be employed.

Figure 6:
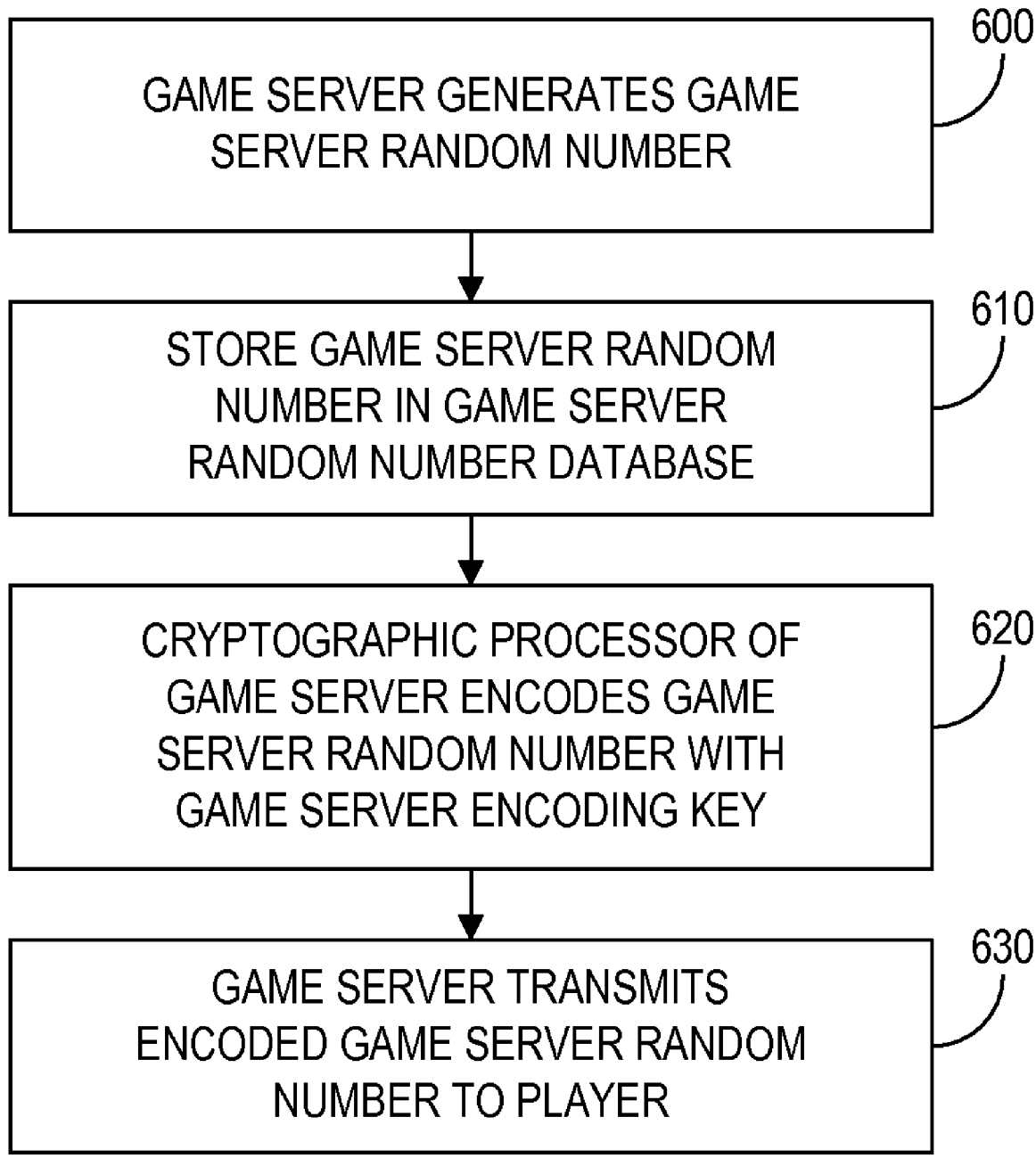
FIG. 6 is a flow chart illustrating an exemplary process by which a game server generates and encodes a random number.

FIG. 6 illustrates a procedure used by game server 200 to generate and encode a game server random number. After authenticating a player, random number generator 225 of game server 200 generates a game server random number at step 600. At step 610, the game server random number is stored in game server random number database 292. At step 620, cryptographic processor 210 of game server 200 encodes the game server random number. As with the encoding of the player random number, cryptographic processor 210 preferably has access to a large supply of unique encoding keys or an algorithm to produce them. At step 630, game server 200 then transmits encoded game server random number to player terminal 300. It should be noted that there are a number of hardware options for the receipt of the encoded game server random number at player terminal 300.

In this embodiment, the system remains secure because the random numbers have been generated and exchanged for future verification, but have not yet been decoded. As such, both parties know that the random numbers have been generated independently, ensuring a fair game result.

Figure 7A:
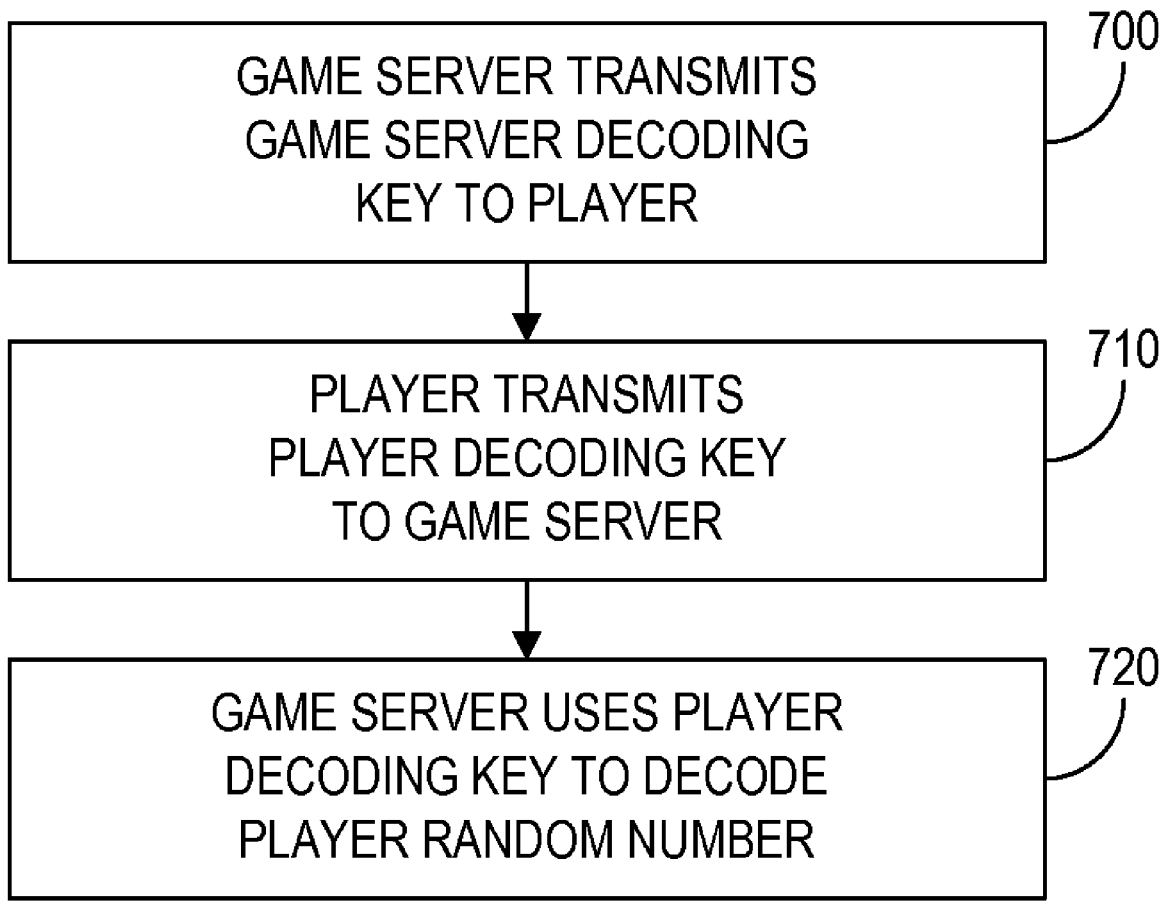
FIG. 7A is a flow chart illustrating an exemplary process of exchanging decoding keys between a player terminal and a game server.

FIG. 7A illustrates a procedure for exchanging decoding keys between the player terminal 300 and game server 200. At step 700, game server 200 (for the first time) transmits game server decoding key to player terminal 300. Like the encoding key used to encode the game server random number, the game server decoding key must be unique for each random number generated. At step 710, the player terminal 300 transmits a unique player decoding key to game server 200. In this embodiment, this exchange of decoding keys need not take place simultaneously since both parties are already in possession of each other's encoded random number. At step 720, game server 200 uses the player decoding key to decode the player random number. At this point, game server 200 now has both a player random number and a game server random number in decoded form and can use these numbers to generate a game result. The player need only decode the encoded game server random number in the event of a dispute, as described below.

Figure 7B:
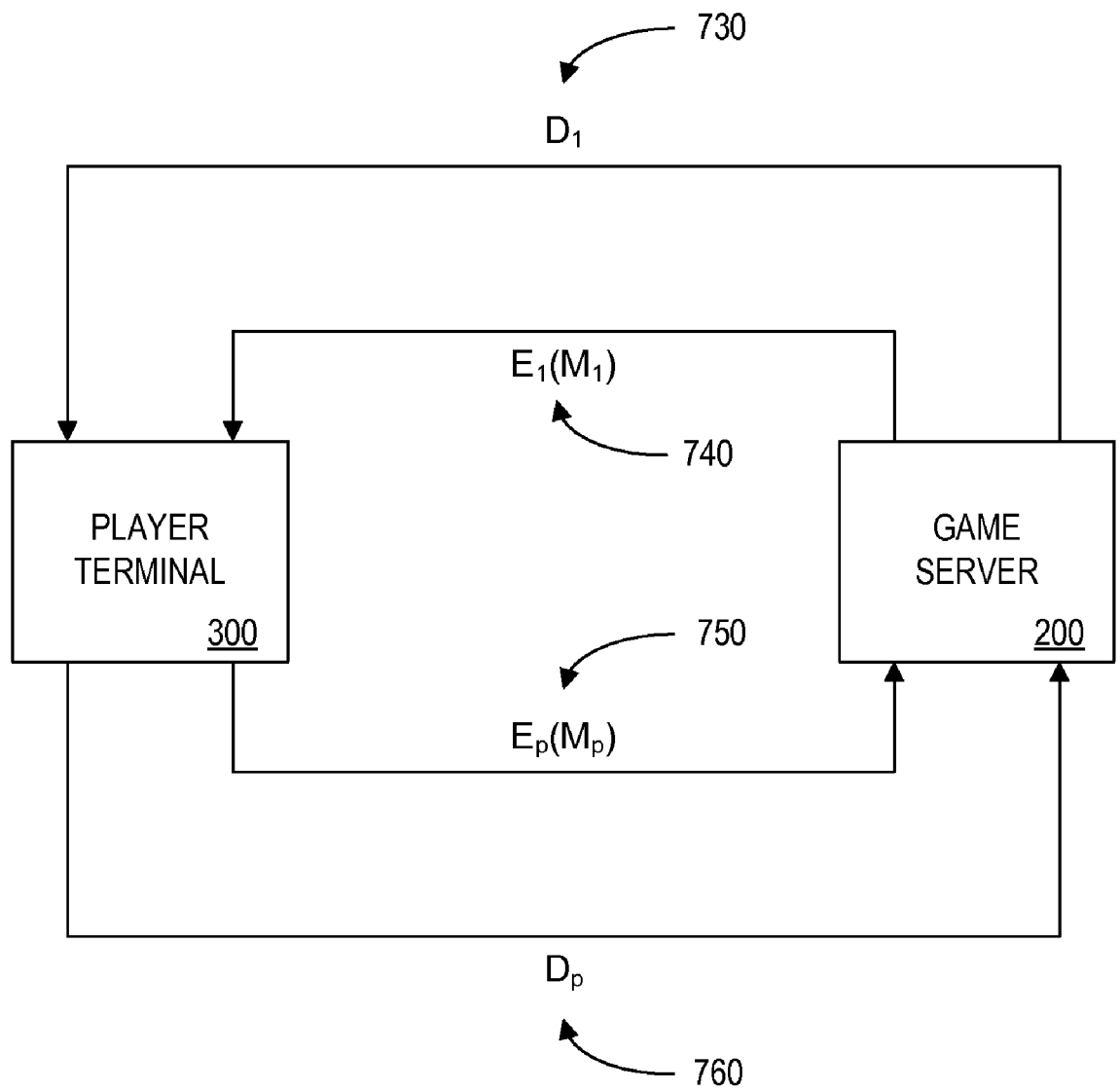
FIG. 7B is a flow diagram illustrating an exemplary exchange of encoded random numbers and decoding keys between a player terminal and a game server.

FIG. 7B illustrates, in flow diagram form, the process described in FIGS. 5 through 7A. As illustrated, the player terminal 300 ultimately transmits to the game server 200 both an encoded player random number, $E_p(M_p)$ (750) and a player decoding key $D_p$ (760). The game server transmits to the player terminal both an encoded game server random number $E_1(M_1)$ (740) and a game server decoding key $D_1$ (730).

Figure 8:
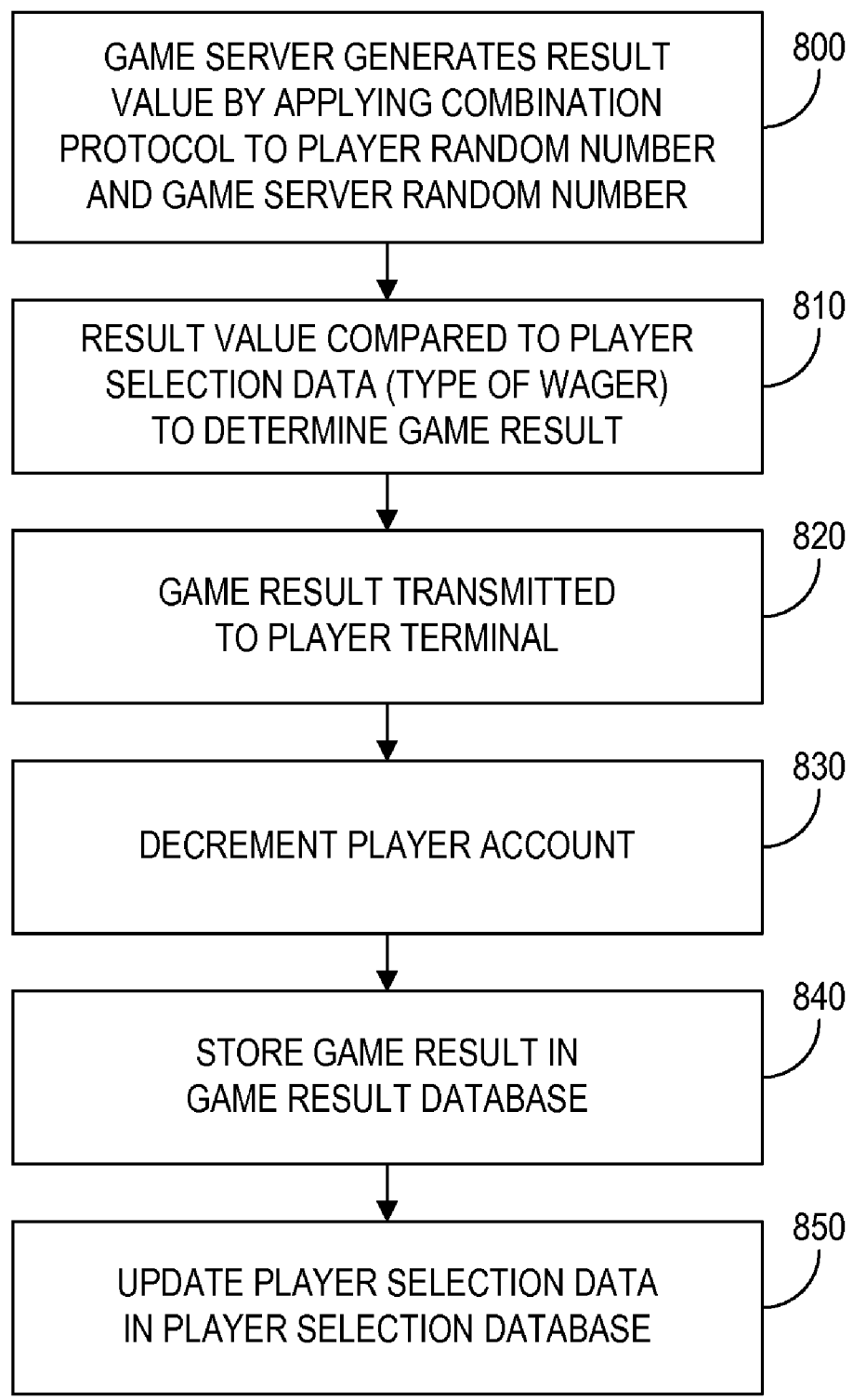
FIG. 8 is a flow chart illustrating an exemplary process of generating a game result based on a combination of a first random number and a second random number.

FIG. 8 illustrates a procedure for the game server 200 to generate a game result. As shown, game server 200 generates a game result based on the game server random number and the decoded player random number using the combination protocol from combination protocol database 298 (FIG. 2). At step 800, the combination protocol is retrieved from combination protocol database 298. The combination protocol is preferably known to both the player terminal 300 and game server 200, is unique to the particular game selected, and may be published for anyone to read. The combination protocol is preferably a series of mathematical steps which transform the player random number and the game server random number into a distinct "result value."

For example, a single game of roulette may have thirty-eight possible outcomes, each outcome corresponding respectively to one of the thirty-eight positions on a roulette wheel. Therefore, an appropriate combination protocol for a roulette game may be one that provides a result value that is, for example, an integer between 0 and 37, inclusive (e.g., thirty-eight distinct values). Each result value can then be mapped to an outcome on a roulette wheel, such as such as "1", "2", or "00". In one example, the combination protocol developed for a roulette game may indicate that the player random number and the game server random number are first multiplied together, with the resulting number squared. This result is then added to the number 5. The remainder, after dividing this resulting number by 38, is the "result value." The result value in this example, therefore, is an integer between 0 and 37, inclusive. For the roulette game, the possible result values (e.g., the thirty-eight integers between 0 and 37, inclusive) are mapped with the set of thirty-eight possible outcomes for the spin of a roulette wheel. Thus, the result value corresponds to the result of the spin of a roulette wheel.

At step 810, the result value is then compared to the type of wager in the player selection data in database 260 to determine a game result. For example, in the roulette example, a player making a bet on "fifteen-red" (see FIG. 2A) would lose the wager if the result value were any number other than "fifteen-red." The game result for a loss might be "lose one dollar" for a one dollar wager. At step 820, the game result is then transmitted to player terminal 300. Payment processor 230 of game server 200 then decrements player account 290 by one dollar, or charges the player's credit card one dollar (step 830), then stores the game result in game result database 265, indexed by the player ID number (step 840). For an improved audit trail, in one or more embodiments the game result is time stamped by clock 235 of game server 200 before being stored, or is cryptographically chained to previously stored game results. The corresponding player selection data stored in selection data database 260 is then updated to indicate that a result has been reached in step 850 (see e.g. the "result" column in FIG. 2). The player may now begin the cycle again by selecting another set of player selection data.

Using one or more of the methods described above, a player may be confident that the random numbers were generated independently of one another. For game server 200 to cheat, it would have to decode the player random number before generating the game server random number. With knowledge of the player random number, game server 200 could select a game server random number to obtain a desired result value and, hence, game result. Obtaining the player random number before generating the game server random number, however, requires game server 200 to decode the encoded player random number, which cannot be accomplished practically before receiving the player decoding key. If the player suspects that game server 200 has cheated by not properly incorporating the player random number, he can decode the game server random number using the game server decoding key and apply the combination protocol from the combination protocol database 380 at the player terminal 300 to both random numbers, thus verifying the game result.

In some embodiments of the present invention, player terminal 300 and game server 200 exchange random numbers. In some embodiments both parties transmit an encoded random number to the other party. In some embodiments, however, only one of the parties needs to encode its random number. The party transmitting its random number without encoding the random number preferably waits until it has received the coded random number from the other party before transmitting its random number. Such embodiments will now be discussed with reference to FIGS. 9 and 10A-10B.

Figure 9:
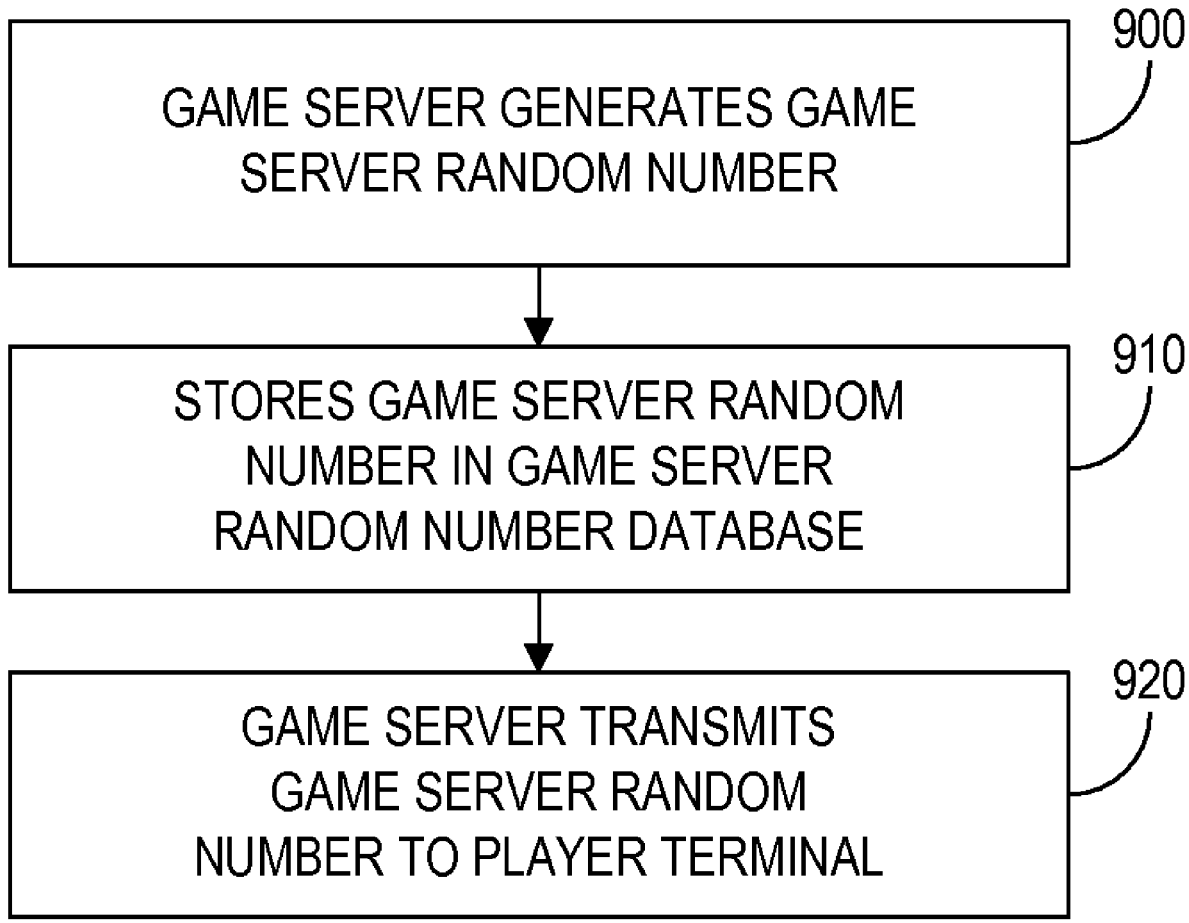
FIG. 9 is a flow chart illustrating an exemplary process of generating and transmitting a random number without encoding it.

Referring to FIG. 9, player terminal 300 has already generated a player random number, encoded it, and transmitted it to game server 200 in a manner similar to that described for the mutual encoding embodiments. At step 900, game server 200 generates a game server random number and, at step 910, stores it in game server random number database 292. At step 920, game server 200 transmits the game server random number to player terminal 300. Since no encoding takes place, however, game server 200 does not transmit a game server decoding key.

Figure 10A:
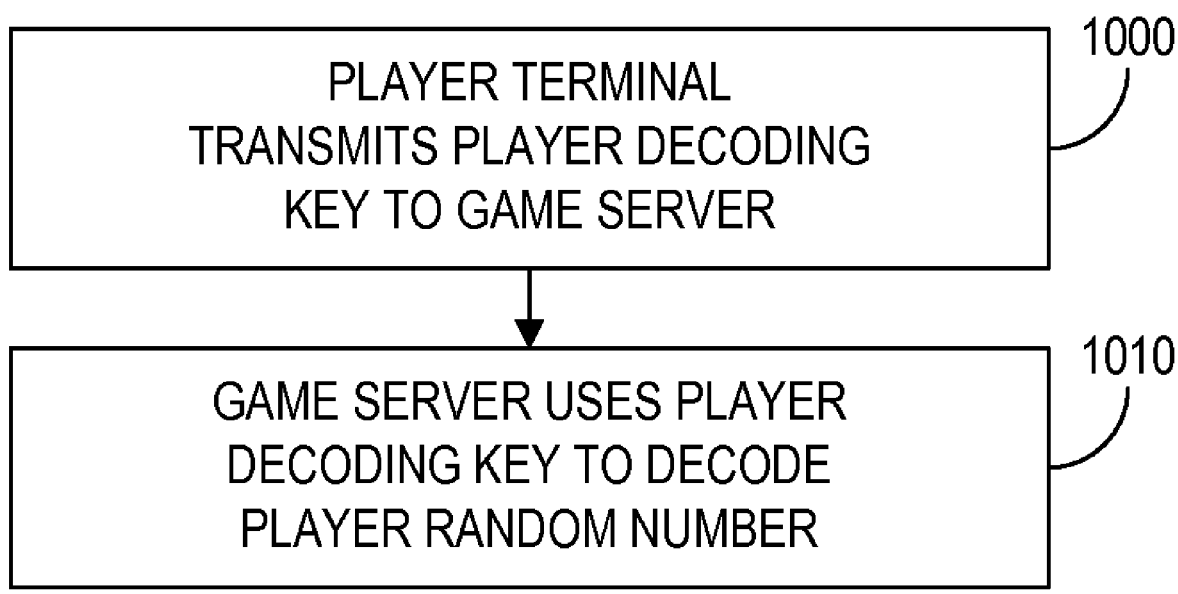
FIG. 10A is a flow chart illustrating an exemplary process of transmitting a decoding key from a player terminal to a game server and decoding a random number.

As shown in FIG. 10A, after receiving the game server random number, player terminal 300 transmits a player decoding key to game server 200 at step 1000. At step 1010, game server 200 uses the player decoding key to decode the encoded player random number. At this point, each party is in possession of the other party's respective random number. The random numbers are then combined as described above to generate a game result.

In some embodiments, player terminal 300 generates and transmits encoded player random number before game server 200 generates and transmits the game server random number. Then, after receiving the game server random number, player terminal 300 transmits the decoding key for the game server 200 to decode the encoded player random number. In one or more alternative embodiments, game server 200 and player terminal 300 switch procedures. Specifically, game server 200 generates and transmits an encoded game server random number before player terminal 300 generates and transmits the player random number. Then, after receiving the player random number, the game server 200 transmits the decoding key for the player terminal to decode the game server random number should the player so choose.

Figure 10B:
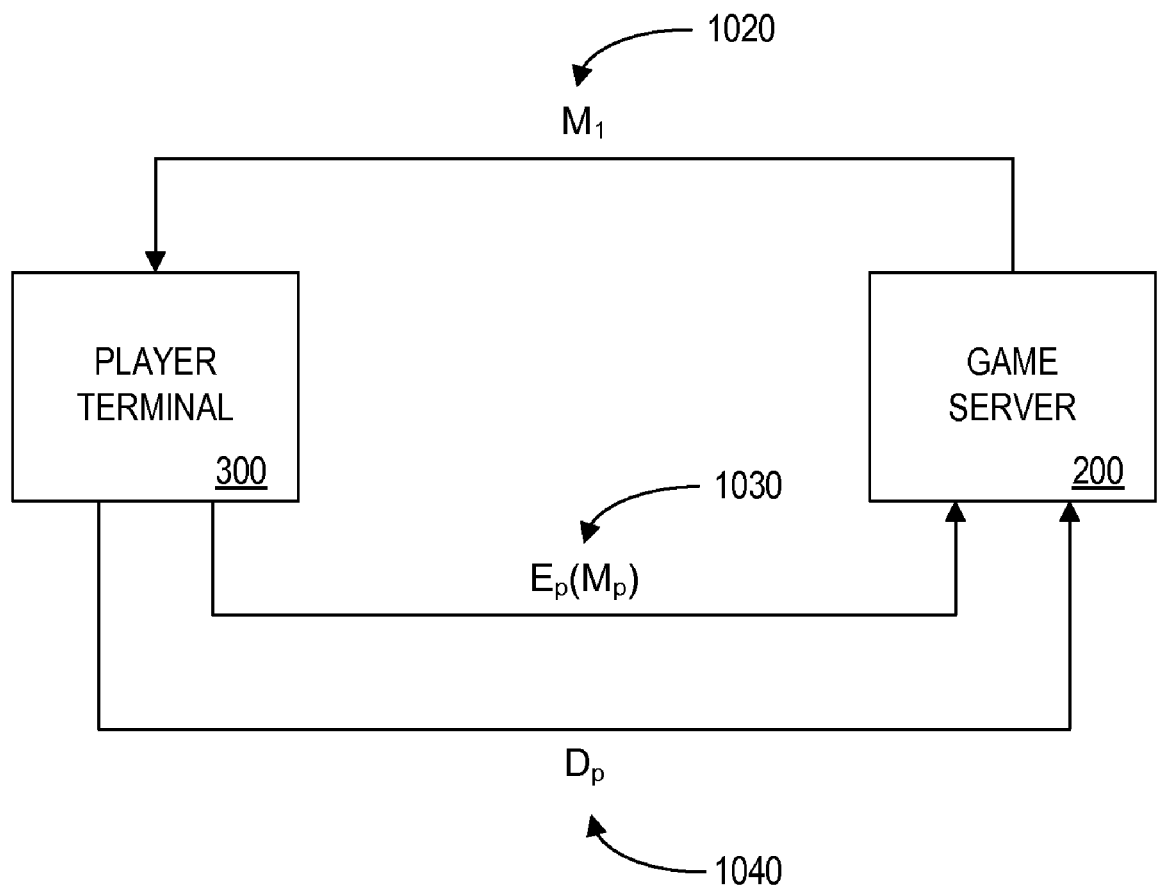
FIG. 10B is a flow diagram illustrating the process of transmitting an encoded random number from a player terminal to a game server, transmitting an unencoded random number from the game server to the player terminal, and transmitting a decoding key from the player terminal to the game server.

FIG. 10B illustrates, in flow diagram form, one or more embodiments in which only one random number needs to be encoded. In FIG. 10B, the player terminal 300 transmits to the game server 200, both the encoded player random number, $E_p(M_p)$ (1030), and the player decoding key, $D_p$ (1040). The game server 200 transmits to the player terminal 300 only the game server random number $M_1$ (1020).

Again, in these embodiments, both the player and the game server 200 may be confident that the player random number and the game server random number were developed independently.

In one or more embodiments of the present invention, neither player terminal 300 nor game server 200 encodes their respective random numbers. Instead, player terminal 300 generates a player random number, hashes it, sends the hash value to game server 200, and then receives the game server random number. The player terminal then transmits the player random number to game server 200, where it is hashed and then compared to the hash value previously received to determine whether it is the number originally generated by player terminal 300. Operation of this embodiment is illustrated in the flow diagrams of FIGS. 11-13A.

Figure 11:
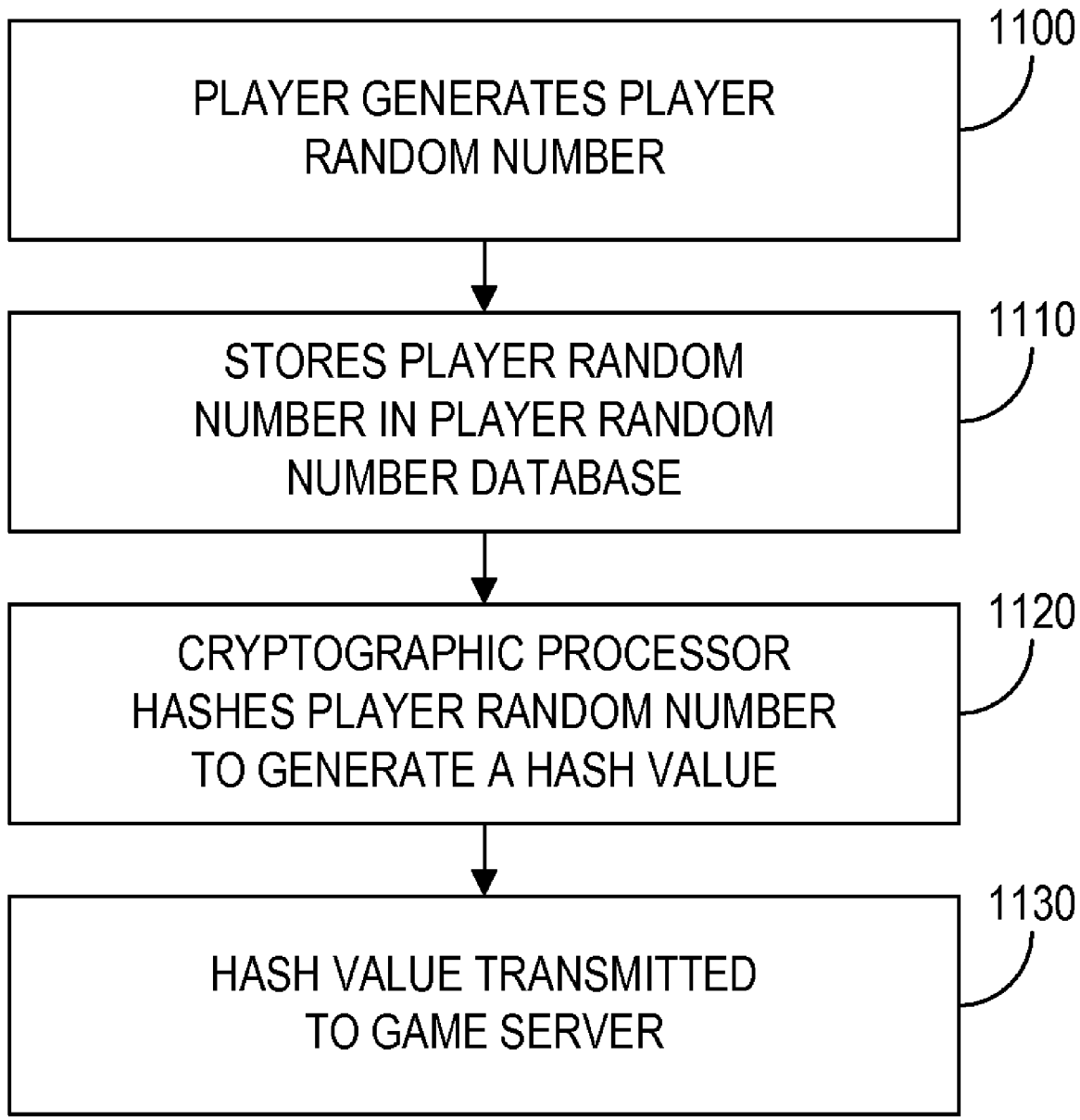

Referring to FIG. 11, player terminal 300 has already transmitted player selection data to game server 200 as described above. At step 1100, player terminal 300 then generates a player random number as previously described. At step 1110, the player random number is stored in player random number database 390 of player terminal 300. Cryptographic processor 310 then hashes the player random number at step 1120, generating a hash value. This hash value represents a one-way transformation of the original player random number. While it is computationally simple to generate the hash value from the player random number, it is computationally unfeasible to re-create the player random number from the hash value alone. At step 1130, player terminal 300 transmits the hash value to game server 200.

Figure 12:
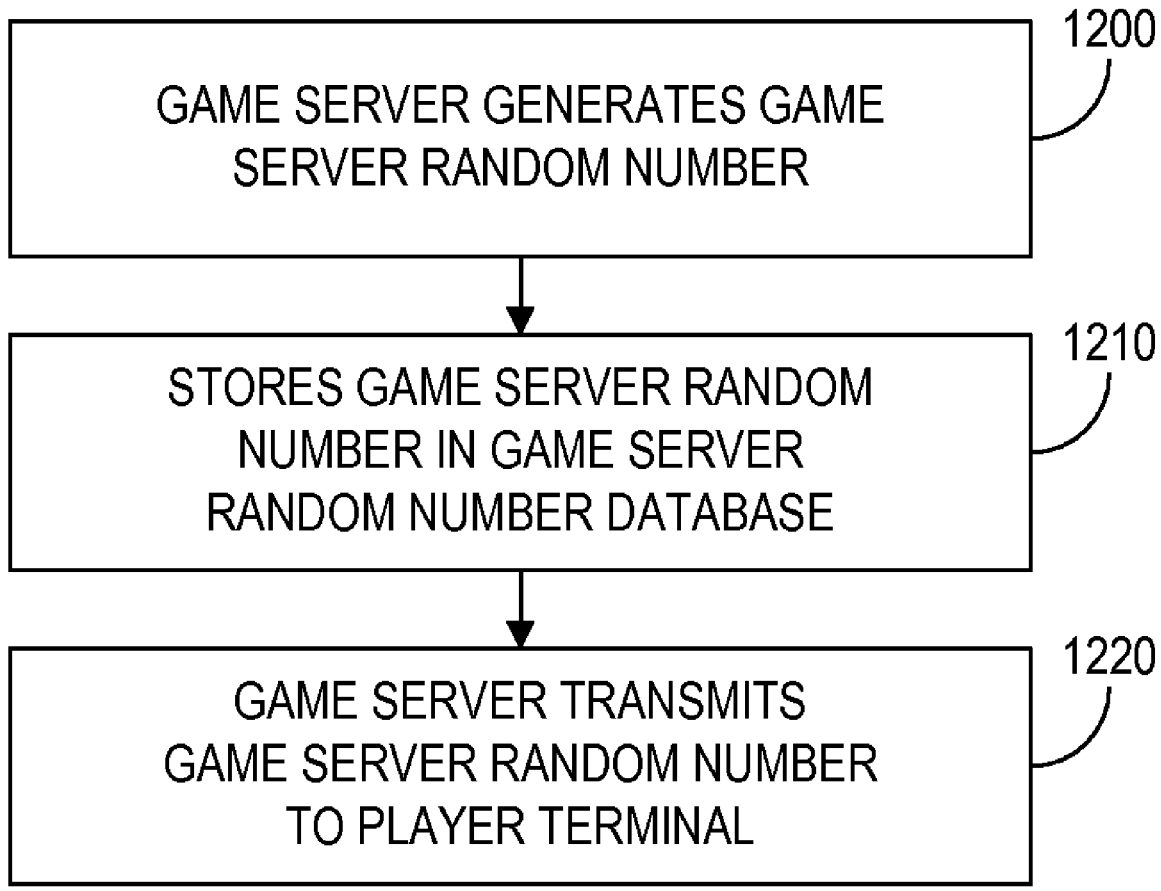

As shown in FIG. 12, game server 200 then generates a game server random number at step 1200. This number cannot be based on the player random number since, in this embodiment, game server 200 only possesses the hash value of the player random number. At step 1210, game server 200 stores the game server random number in game server random number database 292, then, at step 1220, transmits the game server random number to the player terminal.

Figure 13A:
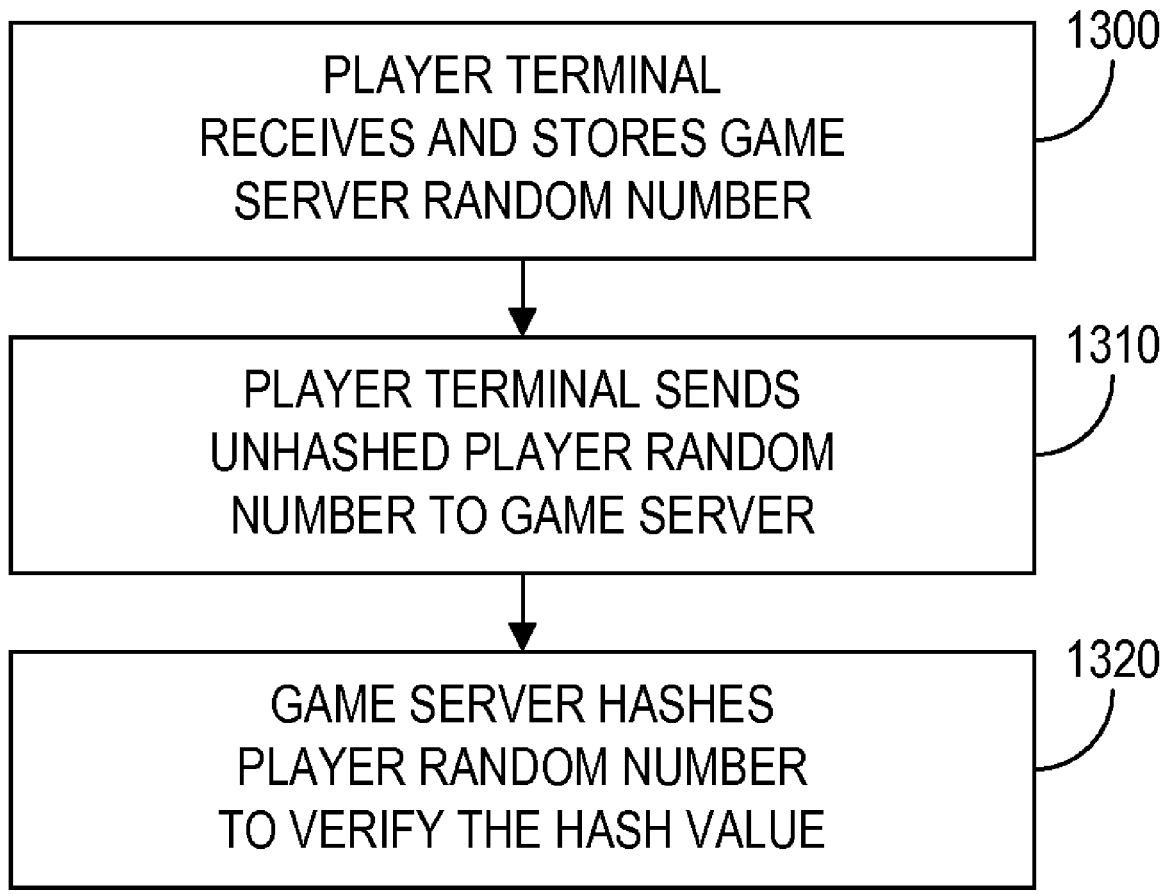

Referring to FIG. 13A, player terminal 300 receives and stores the game server random number at step 1300. At step 1310, player terminal 300 then sends the unhashed player random number to game server 200. At step 1320, cryptographic processor of the game server 200 hashes the player random number, comparing the resulting hash value to the hash value received from player terminal 300. If the hash values match, then game server 200 is assured that player terminal 300 has not submitted an altered player random number. With both random numbers now in its possession, game server 200 then proceeds to generate a game result as described above.

Figure 13B:
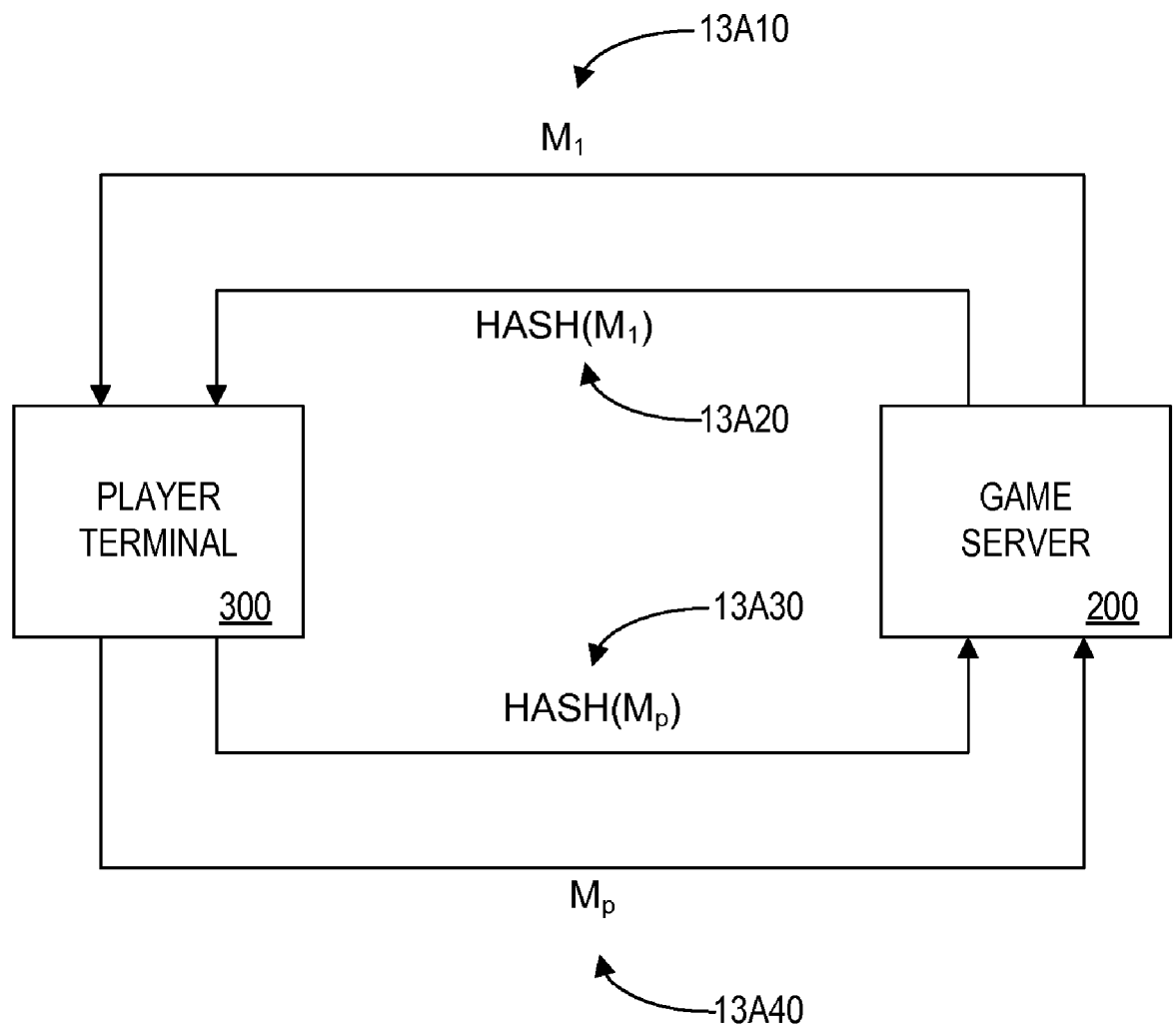
FIG. 13B is a flow diagram illustrating an exemplary exchange of hash values of random numbers, and subsequently the random numbers themselves, between a player terminal and a game server.

FIG. 13B illustrates, in flow diagram form, various hash value embodiments. In FIG. 13B, the player terminal 300 transmits both the hashed player random number, $Hash(M_p)$ (13A30), and the player random number, $M_p$ (13A40), to the game server 200. The game server 200 transmits to the player terminal 300 the hashed game server random number, $Hash(M_1)$ (13A20), and the game server random number, $M_1$ (13A10).

In one or more embodiments employing a hash value operation, the player terminal 300 generates and transmits a hash value of its random number as described above. However, in one or more alternative embodiments, the hash value of a random number may be generated by game server 200, in which case the corresponding procedures of the game server 200 and player terminal 300 are switched.

The various embodiments providing for a hash value described above might not allow a player to determine whether a game server has generated only one random number. The game server, for example, may discover two or more numbers with identical hash values, and transmit the hash value to the player terminal. When the game server later receives the player number, the game server may determine which of the two or more numbers with identical hash values to use in the combination protocol (e.g., the number that will provide a result value and/or game result most favorable to the game server). The game server then transmits the chosen number to the player terminal. Since the chosen number hashes to the hash value sent earlier to the player terminal, the player may not suspect that he has been cheated.

To make the above-described method of cheating more difficult, high quality hash algorithms may be required. As will be understood by those having ordinary skill in the art, a high quality hash algorithm makes it computationally infeasible, given only a particular value, V, to generate any number, N, that hashes to V. One criterion of a good hash function is that the hash value be of a particular minimum length. For example, if a hash value is a binary sequence of length 10, then the game server would need hash at most $2^{10}+1$, or 1025, different numbers before finding two numbers with identical hash values. For most hashing algorithms, a modem computer could very quickly run the algorithm 1025 times, thereby rendering the algorithm ineffective. Therefore, hash values preferably should be of such length that it would be computationally infeasible to test enough numbers so as to find two numbers whose hash values are identical.

In one or more embodiments, player terminal 300 and game server 200 simultaneously exchange random numbers, eliminating the need for any coding or hashing to ensure the independence of the generation of the random numbers.

Figure 14:
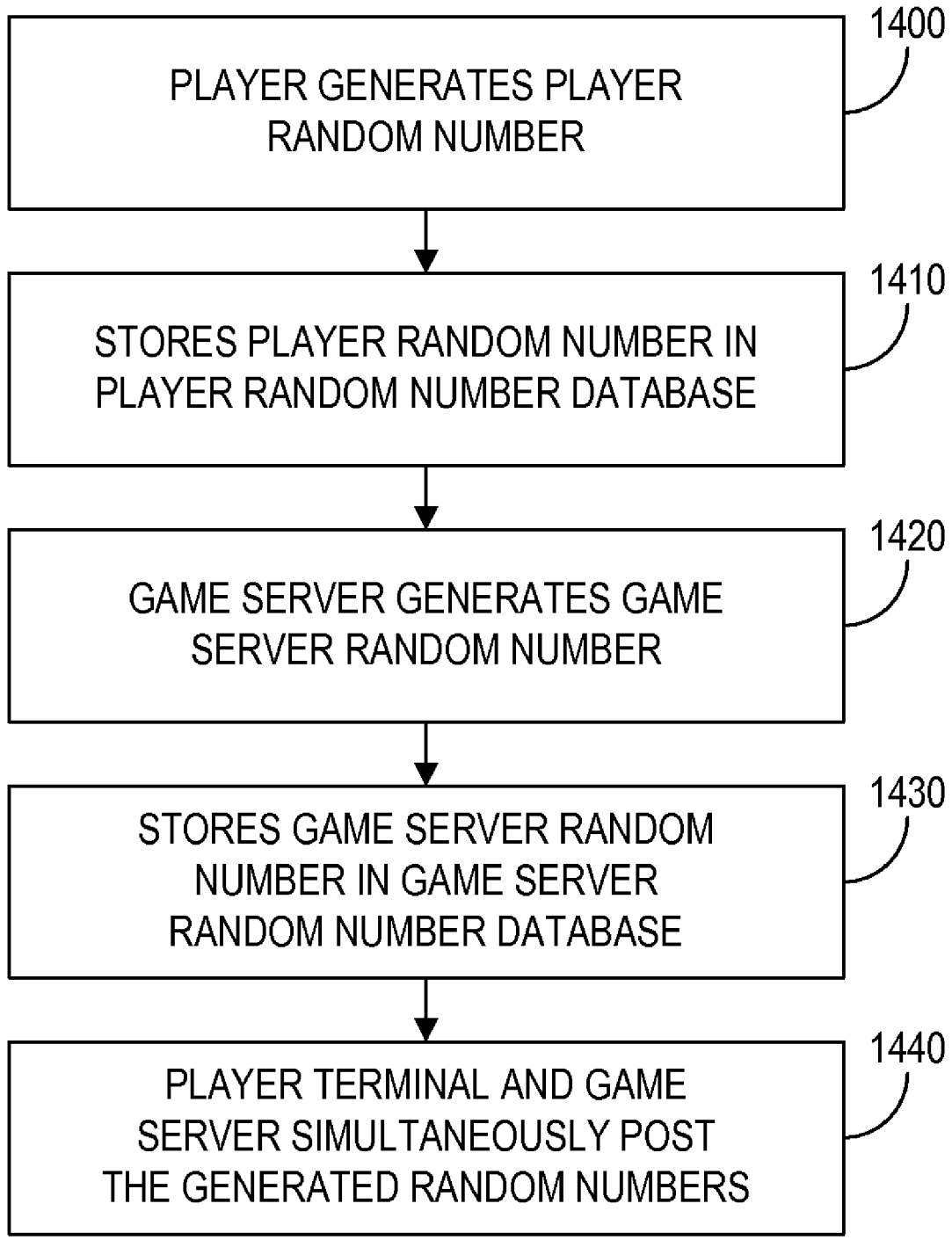
FIG. 14 is a flow chart illustrating an exemplary procedure for simultaneously exchanging random numbers between a player terminal and a game server.

FIG. 14 illustrates a procedure for this embodiment. In FIG. 14, player terminal 300 has already transmitted player selection data as described above. At step 1400, player terminal 300 generates a player random number, then stores it in player random number database 390 at step 1410. At step 1420, game server 200 generates a game server random number and, at step 1430, stores it in game server random number database 292. At step 1440, the player random number and the game server random number are simultaneously posted to an electronic bulletin board. In one or more embodiments, this is accomplished by setting a time at which the random numbers are to be posted. For example, both parties agree to post the random numbers at 3:00 PM, and incorporate this time into their respective communication software. At 3:00 PM, the communications software (not shown separately) automatically posts the random numbers. To deter cheating, the operating system of the electronic bulletin board may be configured to void any random number not posted within a desired period of time (e.g., one thousandth of a second, one tenth of a second) from the agreed-upon posting time. This time requirement is preferably so small as to make the reverse calculations using a combination protocol computationally infeasible.

In one or more embodiments, neither party's number is readable by the other party until after each party has posted its number, for example, to an electronic bulletin board. Therefore, even if the player posts his number first, for example, the game server cannot view the number, and cannot use the player number to generate a desired game server number. Accordingly, the above-described time period for posting may be unnecessary to deter cheating. Of course, a time requirement for posting may be still be preferred in order to ensure a reasonable rate of play for various games. For example, the game server and the player terminal may be required to post their respective numbers at any time between 3:00 PM and 3:01 PM. The parties' numbers may be made accessible as soon as both parties have posted, or at any time thereafter. In some embodiments, the game server and the player terminal are thus able to receive the other party's posted number at substantially the same time. Of course, the parties need not actually access each other's posted number at the same time.

Once the player random number and the game server random number have been posted, a game result may be generated, according to various embodiments of the present invention described herein.

Various methods and systems described herein may be applied to games that are primarily based on chance, such as roulette or craps, and also to games that may be based primarily on player skill but also have an element of randomness. For example, Scrabble™ is a widely-played board game whose object is to assemble letters into words in such a way as to accumulate more points than your opponent. A good Scrabble™ player typically has a large vocabulary and an ability to spot patterns in a random arrangement of letters. Scrabble™ is played in competitions, and there are clear gradations in skill levels. However, there is some randomness in Scrabble™. For example, a player receives letters to complete a group or "hand" of letters from which he can form words; the player typically selects or receives the letters at random. Accordingly, various processes and systems described herein could be used to assure a player (and/or a game server) that the process of letter selection is fair.

For example, in one or more embodiments, each available outcome (e.g., letter selection in Scrabble™) may be mapped to a respective result value, in a manner similar to that described above with respect to a game of roulette. For example, the available letters may be arranged in a predefined order (e.g., alphabetical, by point value), or may be sequenced at random. The position of a letter in the sequence may then correspond to a particular result value. A player and a game server might each select a random integer in the range of 1 to the number of available letters, inclusively. According to an exemplary combination protocol, the player number and the game server number are added, and the result taken modulo the number of letters remaining. One is added to that result to obtain a result value. The result value is then used to select the letter with the position in the sequence that corresponds to the result value. For example, a result value of 8 would select the eighth letter in the sequence of available letters.

Bridge is a card game in which two teams of two compete to either obtain a predicted number of card tricks, or to prevent the other team from doing so. In Bridge, the conduct of the auction and the play phases of the game may require tremendous skill. However, the initial dealing of the hands, as in various other card games, involves chance, as cards are typically shuffled before being dealt. Accordingly, various methods and systems described herein may apply to the dealing of cards in a bridge game.

In one or more embodiments of the present invention, the cards start out in a predetermined order. Each team then submits a random integer in the range of 1 to 52. The integers are added, the result taken modulo 52, and then one is added to determine a result value. The result value indicates the position of the card in the initial ordering with which the first card in the initial ordering should be swapped. Then each team submits another random integer in the range of 1 to 52. The integers are added, the result taken modulo 52, and then one is added. The resulting number indicates the position of the card in the current ordering with which the second card in the current ordering should be swapped. The process continues for a total of 52 times, so that for each possible card position, a card in that position is swapped with another random card. That way, once each team has submitted 52 random integers in the range of 1 to 52, inclusively, the deck has been shuffled, and play can proceed.

Another game involving predominant skill, but some randomness, is a word game involving the placement of letters into a five by five grid. In this game, players receive 25 random letters, one at a time, and must place the letters within the five by five grid. At the end of the game, a player's point total is based on the number of rows and columns in which the player has spelled a word, and the length of the longest word in each row and column. A skilled player may have a large vocabulary and a good feel for where letters are most likely to occur in words. However, there is an element of chance in the game in that a player cannot know in advance what letters he is to receive. Therefore, the methods of this invention can be used to assure a player that he receives letters fairly, and doesn't purposely receive, for example, letters that would make it impossible for him to complete any words. In one or more embodiments, the player terminal and the game server might each generate random numbers in the range of 1 to 26. The combination protocol then adds the numbers, takes the result modulo 26, and adds one. The result value is then used to select the letter with the corresponding position in the alphabet.

Various embodiments described herein relate to protocols in which one player interacts with game server 200. Multiple players could easily be handled by treating each player individually, with players receiving individual game results. Five roulette players, for example, could each submit player selection data and receive a game result based on a different result value. Alternatively, players could combine their player random numbers and receive a game result based on a single communal result value. In this way, game server 200 may more closely parallel a physical casino in which a group of players face wins or losses based on the same spin of the wheel.

In various embodiments involving multiple players, each player generates selection data describing the type of wager that they want to make. Game server 200 then generates a game server random number and encodes it using cryptographic processor 210. Each player terminal 300 generates a player random number and encodes it with its respective cryptographic processor 310. Each player terminal 300 then transmits its encoded player random number to game server 200. Once game server 200 has collected all encoded player random numbers, it transmits the encoded game server random number to each player terminal 300. After receiving the encoded game server random number, each player terminal 300 transmits its player decoding key to game server 200. Game server 200 decodes each encoded player random number and uses them to generate a game result using the combination protocol from combination protocol database 298, which may store different protocols for various numbers of players, up to the maximum number of players allowed in a game. The game result is transmitted to each player terminal 300. Players can verify the result value by exchanging decoded player random numbers with each other and comparing them with the game server random number after decoding it with a game server decoding key.

In one or more embodiments, each player terminal 300 generates player selection data and a player random number. The first player encodes his player random number and transmits it to the second player. The second player concatenates his random number with the encoded random number from the first player, and encodes both numbers before sending them to the third player. This process continues for each of the players. The last player sends the combined player random number to game server 200. Game server 200 creates a game server random number, encodes it, then transmits it to each player. After receiving the game server encoded random number, each player terminal 300 sends its player decoding key to game server 200. Cryptographic processor 210 of game server 200 decodes the combined player random number using these decoding keys, forms a result value, and produces a game result for each player.

As will be understood by those having ordinary skill in the art, instead of, or in addition to, the mutual encoding described above, hash algorithms, single encoding, and simultaneous exchange procedures consistent with those described above may be used to facilitate the interaction of multiple players.

Outcomes for gambling games are determined by either a single event or a multiple event. Roulette and slots are good examples of single event games as a single outcome determines the game result. One spin of the roulette wheel completely resolves all bets placed on that spin. The result of a slot machine wager requires a single handle pull to determine whether the player wins or loses. In these single event games, a result value is easily compared to player selection data to determine a game result.

In multiple event games, however, a game result may be based on multiple result values. Blackjack is one example of a multiple event game. Whether a player wins a hand depends on the player's cards and the dealer's cards. Accordingly, in one or more embodiments of the invention, a result value represents the complete sequence of fifty-two cards. Once the card sequence is defined based on the player random number and the game server random number, the cards can be dealt.

For example, after generating an encoded player random number and transmitting it to game server 200, player terminal 300 receives the encoded game server random number. Player terminal 300 then transmits a decoding key to game server 200 which generates the result value representing the complete sequence of cards in the deck. Before sending a game server decoding key to player terminal 300, game server 200 sends the player card values representing a hand of cards dealt from the sequence of cards generated by the result value. If he desires, the player then elects to draw additional cards for his blackjack hand, again, from the defined sequence of cards. Once the hand is selected, game server 200 transmits a game server decoding key to player terminal 300. It is important that the player not receive this key before making his selection to draw additional cards, since decoding the game server encoded random number would allow the payer to know the complete sequence of cards.

Another method for handling multiple event games, such as blackjack games, is to generate a result value for each event (e.g., each card dealt, each hand dealt). In a blackjack example, after making his bet (by establishing player selection data) the player generates a series of player random numbers, exchanging them with game server 200 for each card required in the hand. The game result might therefore require seven or eight result values, each one created according to one or more of the various described procedures of the present invention.

Accordingly, it will be understood by those having ordinary skill in the art that a single result value may correspond to one or more events. For example, as described herein, one result value may be used to determine only a corresponding single card, or a single result of a slot machine spin. As also described herein, one result value may also correspond to a series, set, or sequence of events, such as a plurality of cards (e.g., a deal of cards, a hand of cards, or a deck of cards). A particular game, system, or application need not use all determined result values in any one way. Accordingly, a particular game, system, or application may use a first result value to determine a single event and a second result value to determine multiple events. Specifically, it will be understood that any particular determined result value may be used to determine a corresponding single event or corresponding multiple events, as considered practicable for the particular game, system or application.

In certain embodiments of the present invention, authentication of authorship of the player selection data and player random number involves checking an attached ID or name and comparing it with those stored in player database 255. In an alternative embodiment, cryptographic protocols are added to the authentication process. These protocols enhance the ability to authenticate the sender of a message and serve to verify the integrity of the communication itself, proving that it has not been altered during transmission. Encryption can also prevent eavesdroppers from learning the contents of the communication. Such techniques shall be referred to generally as cryptographic assurance methods and include the use of both symmetric and asymmetric keys as well as digital signatures and hash algorithms.

The practice of using cryptographic protocols to ensure the authenticity of senders as well as the integrity of communications is well known in the art and need not be described here in detail. Any conventional cryptographic protocols such as those described in Bruce Schneier, *Applied Cryptography: Protocols, Algorithms, and Source Code in C*, ($2^{nd}$ ed., John Wiley & Sons, Inc., 1996), could be used in accordance with the present invention and would be executed by cryptographic processor 210.

Figure 15:
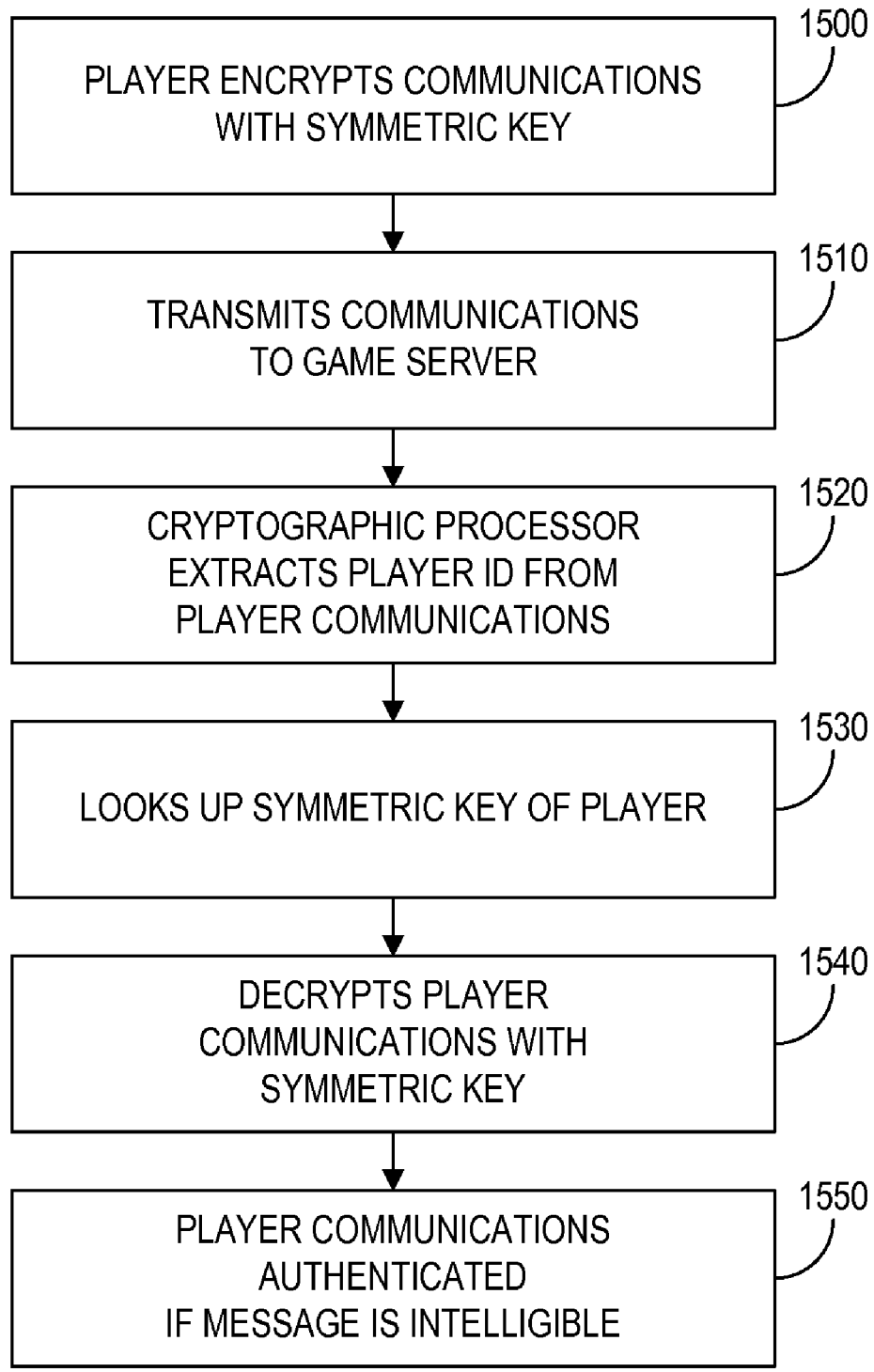
FIG. 15 is a flow chart illustrating an exemplary procedure for encoding and decoding a player communication using a symmetric key.

FIG. 15 illustrates a symmetric key embodiment in which player terminal 300 and game server 200 share a key. Thus, both encryption and decryption of the player selection data and player random number (also referred to separately or together as a player communication) are performed with the same key. This encryption may be implemented with an algorithm such as DES (U.S. Government standard, specified in FIPS PUB 46), or with any of several algorithms known in the art such as AES, IDEA, Blowfish, RC4, RC2, SAFER, etc.

Initially, a player encrypts his communication with his assigned symmetric key at step 1500, using cryptographic processor 310 of player terminal 300. The key may be stored in encoding key database 375 or otherwise stored or memorized by the player. The player communication is then transmitted to cryptographic processor 210 of game server 200 at step 1510. Cryptographic processor 210 extracts the player ID from the player communication (step 1520), looks up the symmetric key of the player in player database 255 (step 1530), and decrypts the player communication with this key (step 1540). Game server encoding key database 294 contains algorithms and keys for encrypting, decrypting, and/or authenticating communications. At step 1550, the cryptographic processor 210 determines if the resulting communication is intelligible. If so, then the communication must have been encrypted by the same key, authenticating that the player must have indeed been the author of the message. It will be understood that these cryptographic techniques are employed to protect the security of the communications, in addition to the appropriate random number encryption technique described above.

This procedure makes it difficult for an unauthorized player to represent himself as a legitimate player. Without cryptographic procedures, an unauthorized player who obtained a sample communication from a legitimate player might be able to extract the player ID and then attach this ID number to unauthorized communications. When player communications are encrypted with a symmetric key, however, an unauthorized player obtaining a sample player communication only discovers the player's ID number, not the symmetric key. Without this key, the unauthorized player cannot create a player communication that will fool game server 200, since he cannot encrypt his communication in the same way that the authorized player could. The symmetric key protocol also ensures that the player communication has not been tampered with during transmission, since alteration of the communication requires knowledge of the symmetric key. An encrypted player communication also provides the player with more anonymity.

Figure 16:
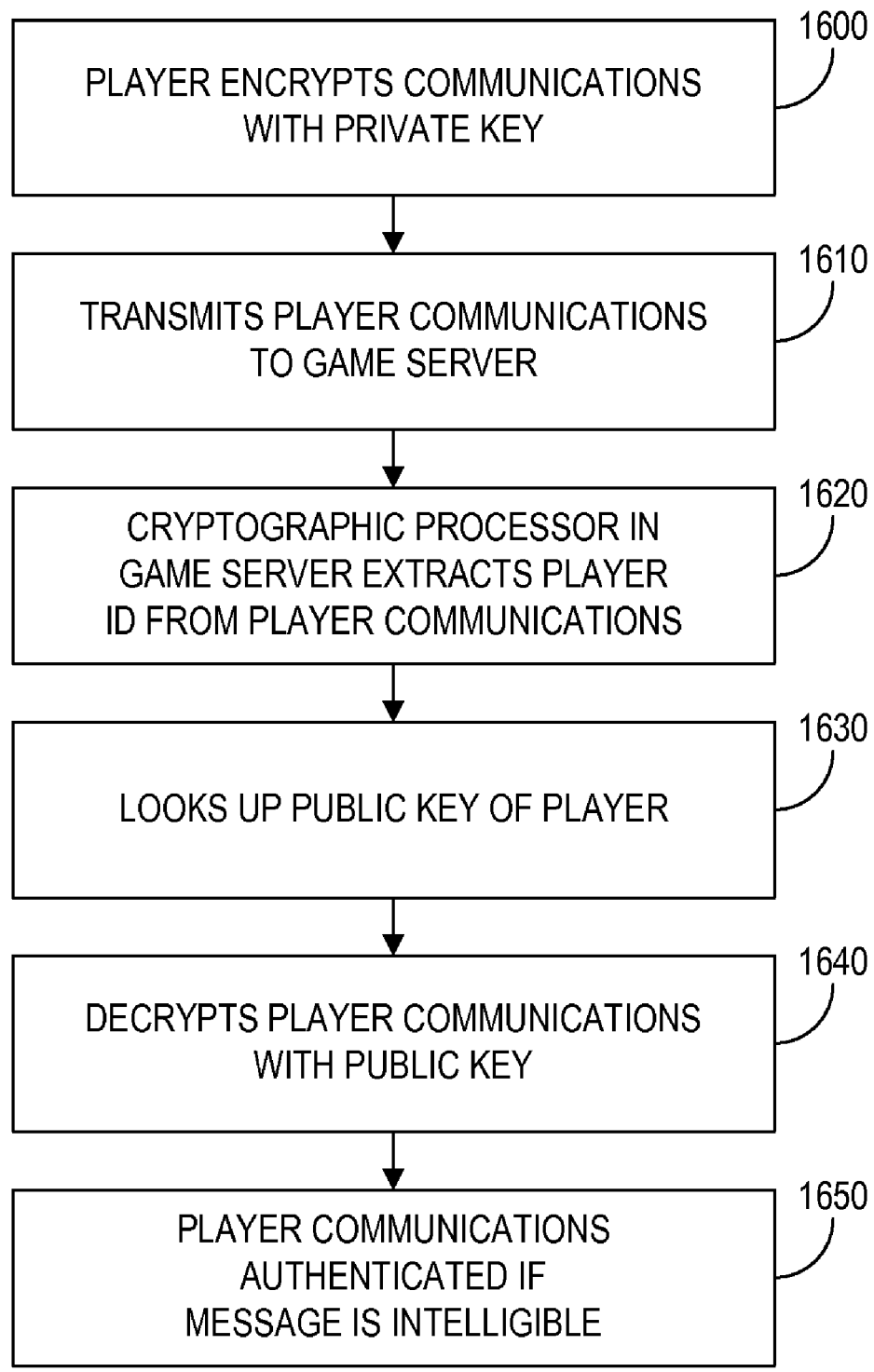
FIG. 16 is a flow chart illustrating an exemplary procedure for encoding and decoding a player communication using asymmetric keys.

FIG. 16 illustrates an asymmetric key protocol in which a player communication is encrypted with a private key and decrypted with a public key. Two such algorithms for asymmetric key protocols are the RSA algorithm and the Digital Signature Algorithm ("DSA"). At step 1600, player terminal 300 encrypts the player communication with the player's private key using cryptographic processor 310. Player terminal, 300 then transmits the player communication to game server 200 at step 1610. Cryptographic processor 210 at game server 200 then extracts the player ID at step 1620, looks up the players associated public key in player database 255 at step 1630, and decrypts the communication with this public key at step 1640. As before, if the player communication is intelligible then game server 200 has authenticated the player at step 1650. Again, unauthorized players obtaining the player communication before it is received by game server 200 are not able to undetectably alter it since they do not know the private key of the player. Unauthorized players might, however, be able to read the message if they managed to obtain the public key of the player. Communication secrecy is obtained if the player encrypts the player communication with his public key, requiring the unauthorized player to know the player's private key to view the player communication.

Figure 17:
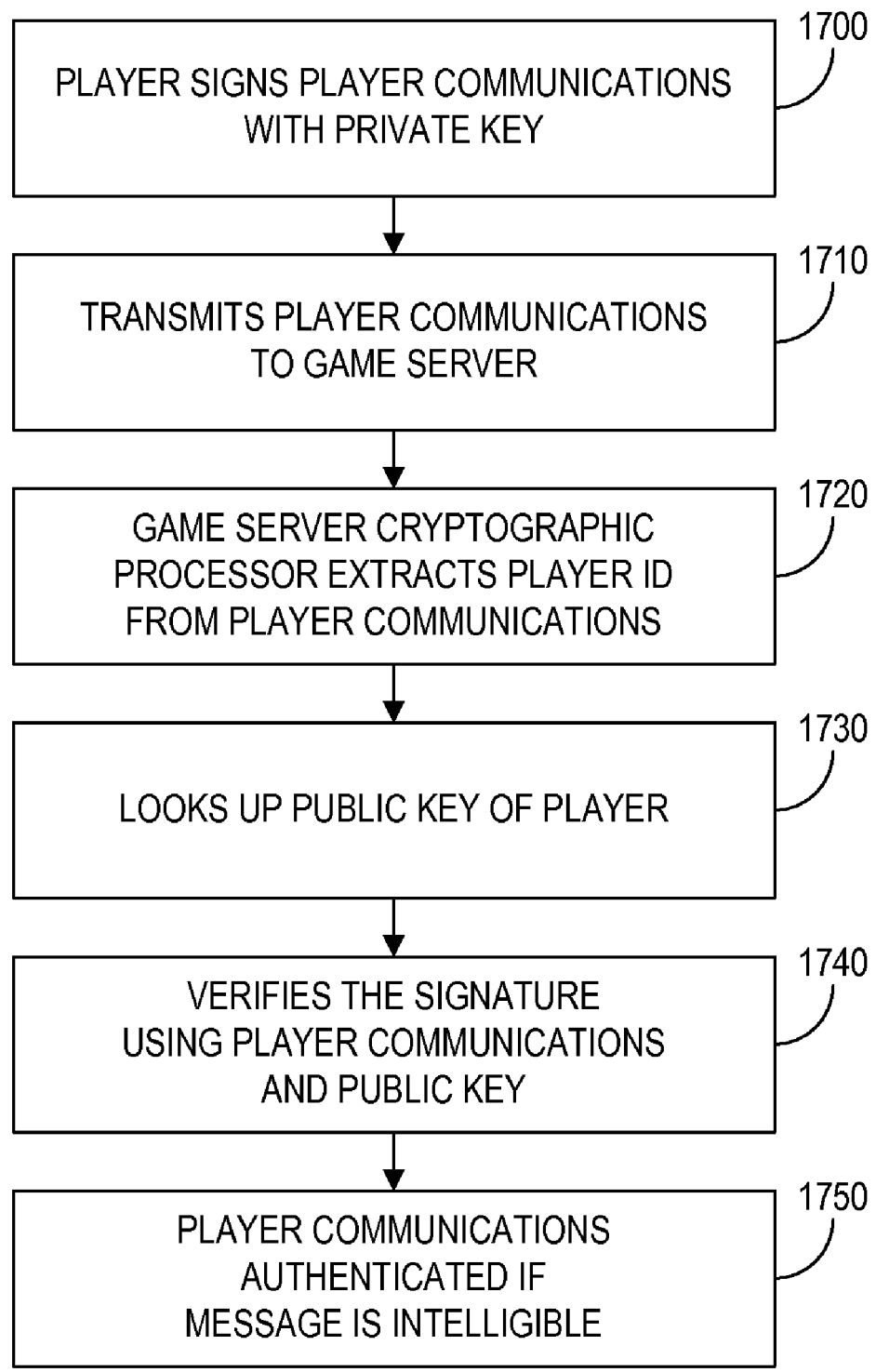
FIG. 17 is a flow chart illustrating an exemplary procedure for providing authentication and message integrity.

FIG. 17 shows a cryptographic technique using digital signatures to provide authentication and message integrity. One such algorithm is DSA. As in the asymmetric protocol described above, each player has an associated public and private key. The player signs his communication with his private key at step 1700 with cryptographic processor 310 and transmits it to game server 200 at step 1710. At game server 200, cryptographic processor 210 extracts the player ID at step 1720 and looks up the player's public key at step 1730, verifying the signature using the communication and the public key of the player at step 1740. If the communication is intelligible, then game server 200 accepts the communication as authentic at step 1750.

Figure 18:
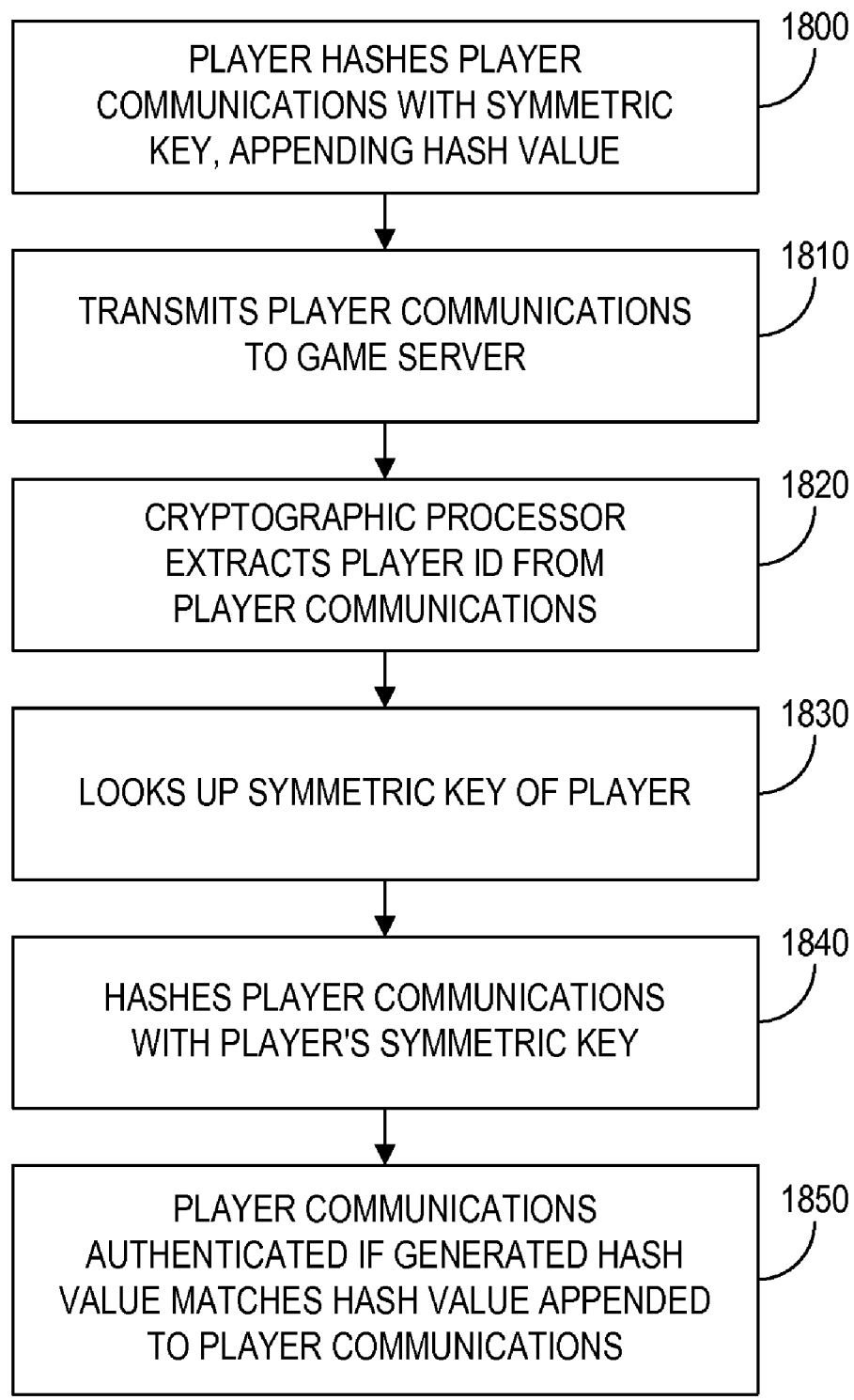
FIG. 18 is a flow chart illustrating another exemplary procedure for providing authentication and message integrity.

Referring now to FIG. 18, there is illustrated a cryptographic technique using message authentication codes for verifying the authenticity and integrity of a player communication. In the hash protocol of the present invention, player terminal 300 and game server 200 share a symmetric key, which the player includes in a hash of the communication at step 1800. In the hash protocol, a one-way function is applied to the digital representation of the communication. Any of the MAC algorithms, such as RIPEMAC, IBC-Hash, CBC-MAC, or the like, may be applied in this application. After transmitting the communication to game server 200 at step 1810, cryptographic processor 210 of game server 200 extracts player ID from the player communication at step 1820. Then cryptographic processor 210 looks up the player's symmetric key at step 1830 and hashes the communication with the symmetric key at step 1840, comparing the resulting hash value with the hash value attached to the communication. If the values match at step 1850, the integrity of the communication is verified along with the authenticity of the player.

Although cryptographic techniques can provide greater confidence in the authenticity of player communications, they are useless if the players' cryptographic keys are compromised. An unauthorized player who obtains the symmetric key of another player is indistinguishable from that player in the eyes of game server 200. There is no way to know whether the player was the true author of the communication, or an unauthorized player with the right cryptographic keys. In one or more embodiments, biometric device 355 (FIG. 3) such as a fingerprint reader, voice recognition system, retinal scanner, or the like help to solve this problem. A biometric device incorporates a physical attribute of the player into a communication, which is then compared with the value stored in player database 255 at game server 200.

Fingerprint verification, for example, may be executed before the creation of a communication, during the generation of a communication in response to prompts from game server 200, at some predetermined or random time, or continuously by incorporating the scanning lens into player terminal 300 and requiring the player to maintain a finger on the scanning lens at all times for continuous verification while the communication is generated.

An example of such a biometric device is the FingerLoc™ AF-S2™ fingerprint identification system available from AuthenTec, Inc. The AF-S2™ utilizes a sensor matrix, consisting of 16,384 individual elements arranged in a 128 by 128 grid. When a player places his finger on the grid, an electromagnetic signal is generated by a ring surrounding the grid. The resulting electromagnetic field varies according to the ridges and valleys of the player's fingerprint. Each element of the grid then acts as an antenna, picking up the local electromagnetic signal. The elements can distinguish fine variations in the electromagnetic field, and use these variations to generate a digital fingerprint image. The digitized image is then stored in memory. Each live-scan fingerprint is compared against the previously enrolled/stored template, stored in data storage device 360. If the prints do not match, the cryptographic algorithms executed by cryptographic processor 310 may prevent the player from generating a communication.

In a voice verification embodiment, the player's voice is used to verify his identity. This embodiment has the advantage of not requiring the use of any specialized hardware since it can be implemented over a standard phone connection. The player's identity is verified at game server 200. The process of obtaining a voice-print and subsequently using it to verify a person's identity is well-known in the art, and therefore need not be described in detail. Conventional speaker identification software samples the player's voice. This sample is stored at game server 200 in player database 255. Each time the player wants to transmit a communication to game server 200, he is required to call game server 200 and speak into the phone at the prompt for a voice sample. If this sample matches that stored in player database 255, the player is provided a password which is incorporated into the digital signature appended to his communication. Any communication received without an appropriate voice match password is not accepted. The voice-print may also be stored in a database within data storage device 360 of player terminal 300, to verify the player's identity locally prior to allowing his communication to be created.

As mentioned previously, the present invention allows for the anonymity of players. Such anonymity is accomplished by eliminating all references to the names of the players for all communications. A player, for example, would include his ID in the player selection data, rather than his name, preventing eavesdroppers from discovering the player's identity. To prevent detection of a players ID stored in player database 255, the ID numbers are preferably encrypted with the public key of game server 200.

As an additional protection of identity, the player may communicate with game server 200 through conventional anonymous remailers found on the Internet.

While the invention can be implemented without provisions for payment features, there are many methods by which the providers of the foregoing systems could derive a revenue stream. In one or more embodiments, a flat fee is charged for every set of player selection data submitted. In other embodiments, flat fees would cover any number of sets of player selection data over a given period of time, allowing players to subscribe to the service much as they would subscribe to a newspaper. In another embodiment, advertisers pay to have messages listed along with the Web pages for the player selection data, supplementing the costs of operating the system.

In some embodiments of the present invention, the combination protocol may transform the player random number and the game server random number into multiple result values. For example, the multiple result values could represent ten different spins of a roulette wheel, five different rolls of the dice in craps, or twelve different cards drawn in video poker. With multiple result values being generated based on a single pair of random numbers, the player terminal and the game server would have to generate fewer random numbers, and would have to perform fewer encryption and decryption operations, thus speeding up the play of the game.

In a roulette game, for example, the combination protocol may transform the player random number and the game server random number into multiple result values corresponding to multiple spins. In two typical games of roulette, there are 38*38, or 1444, possible sequences of two outcomes (e.g., "1" and "9"; "24" and "24"; or "00" and "12"). Therefore, in one exemplary combination protocol, the player random number and the game server random number might each be a number between 1 and 1444, inclusive. According to the combination protocol, the two random numbers are then added, modulo 1444, to yield a number between 0 and 1443, inclusive. This number is then divided by 38 in order to yield a quotient and a remainder. Both the quotient and the remainder will be numbers between 0 and 37, inclusively. The quotient may thus serve as a first result value, and the remainder may serve as a second result value. Each result value may be mapped to respective individual outcomes, each individual outcome representing, for example, one spin of a roulette wheel.

Although the exemplary combination protocol was described above with respect to two result values for a roulette game, other combination protocols useful for transforming a player random number and a game server random number into one or more result values will be obvious to those having ordinary skill in the art. Similarly, combination protocols useful for various different types of games will be obvious to those having ordinary skill in the art.

In some embodiments of the present invention in which more than one result value is obtained from a game server number and a player number, the player must place wagers on all result values to be obtained from a combination protocol before obtaining a decoding key from the game server. Otherwise, the player would be able to predict future result values by using the combination protocol applied to the player random number and the game server random number. The player could then make wagers only when future result values would be favorable to the player.

In some embodiments, the player, the player terminal, and/or the game server may establish rules for placing wagers on the multiple result values to be obtained from a combination protocol (and/or on the corresponding game results). Such rules could be stored, for example, in player database 255. A rule might specify, for example, that if the player wins on a first result value, he is to double his wager for the next result value. Another rule might specify that a player is to continue placing wagers on successive result values until his net loss exceeds ten tokens. Once rules for placing wagers have been established, and the player has committed to following such rules, then it no longer matters whether or not the player can anticipate future result values through the use of the game server decoding key. Even if the player knows that future result values will be unfavorable, he is still bound to follow the specified rules for placing wagers.

Even if a first party may be confident that a second party has generated its random number independently of the first party's number, the first party may not be sure that the other party has generated only one number.

For example, the game server may attempt to cheat by generating two or more game server numbers, such that each can be encoded to yield the same result. Once the game server knows the player random number, the game server can determine which of the two or more game server numbers to use in the combination protocol in order to achieve a desired game result. For example, after the game server receives the player decoding key, the game server can decode an encoded player random number. Alternatively, an unencoded player random number may have been received. Based on the player random number, the game server then transmits to the player terminal the game server decoding key corresponding to the chosen random number. The game server then uses the combination protocol, the player random number, and the chosen game server random number to generate the game result.

For example, a game server may use the following procedure to generate multiple numbers whose encoded values are identical. First, the game server generates multiple pairs of keys, $E_K$ and $D_K$, representing keys in an asymmetric key algorithm. In each pair, $E_K$ is used in combination with an encryption algorithm to generate an encoded version of a number, $M_K$. The encoded number is denoted $E_K(M_K)$. Given $E_K(M_K)$, $M_K$ can be determined by employing the key $D_K$ in a decrypting algorithm. Thus, $DK(E_K(M_K))=M_K$.

Figure 19A:
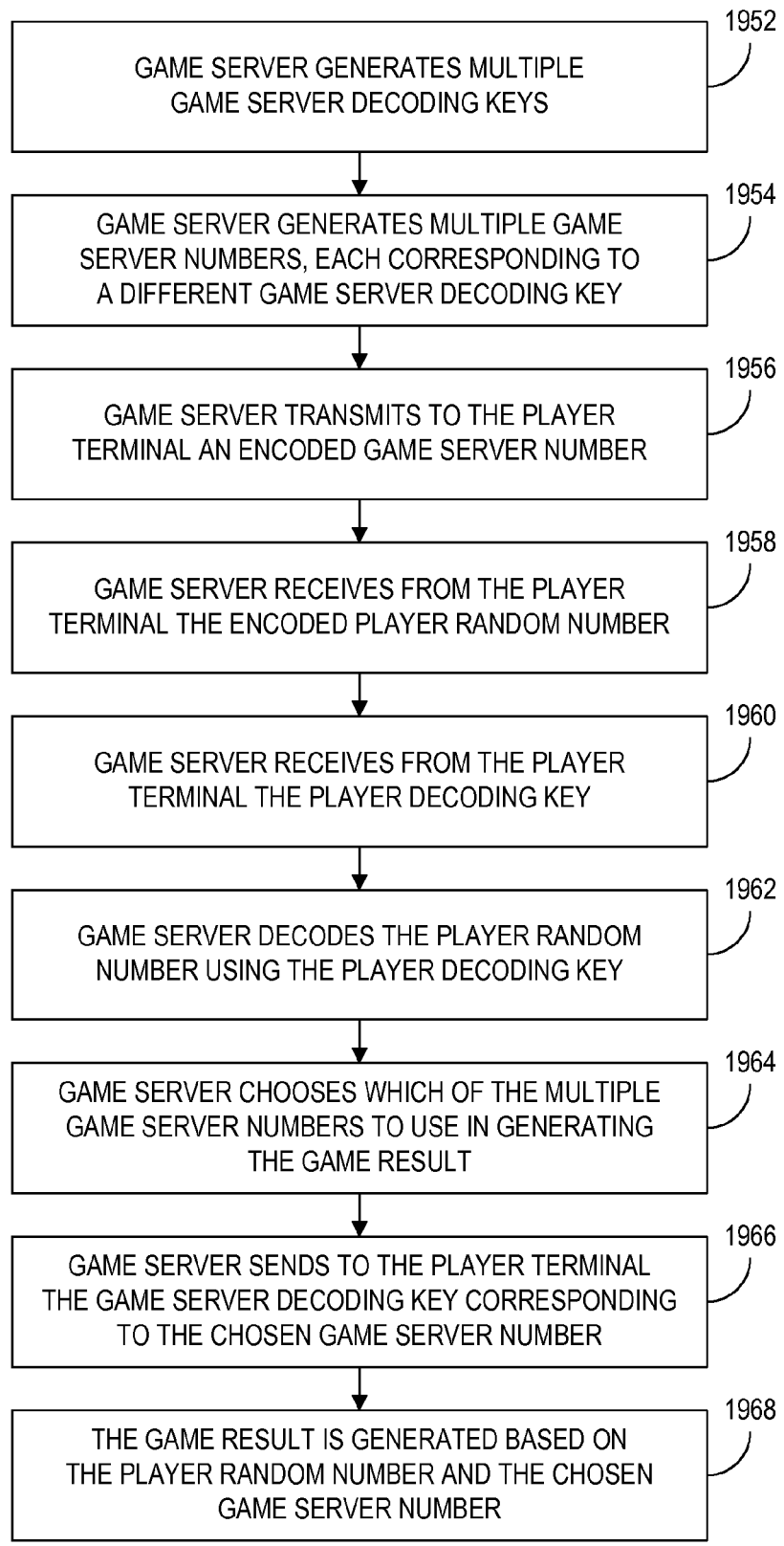
FIG. 19A is a flow chart illustrating an exemplary process for generating multiple decoding keys.

At step 1952 in FIG. 19A, the game server generates multiple decoding keys. The generation of the game server encoding keys is not always necessary. Once the game server has generated the multiple pairs of keys, the game server, at step 1954, chooses a number, $M_1$. The number $M_1$ may be generated randomly or may be chosen by the game server in any other fashion. The game server then generates $M_2$ according to the following formula: $M_2=D_2(E_1(M_1))$. Similarly, $M_3=D_3(E_1(M_1))$, and $M_K=D_K(E_1(M_1))$.

The game server initially transmits to the player terminal $E_1(M_1)$, (step 1956). At step 1958, the game server receives from the player the encoded player random number, and at step 1960, the game server receives from the player the player decoding key, which allows the game server to view the player random number (step 1962). At step 1964, the game server may test the combination protocol on the player's number in combination with each of $M_1, M_2, \ldots M_n$. The game server then chooses a number, $M_K$, from the set of $M_1, M_2, \ldots M_n$, that yields the result value that is most desirable for the game server. At step 1966, the game server then transmits the corresponding decoding key, $D_K$, to the player terminal. Finally, at step 1968, the game server generates the game result based on the player random number and the chosen game server number.

Note that in the above procedure, $M_1$ need not be chosen. Rather, $E_1(M_1)$ may be chosen, and $M_1$ may be derived by $M_1=D_1(E_1(M_1))$. Also note that the encrypting keys, $E_1 \ldots E_n$, need not necessarily ever be generated.

Figure 19B:
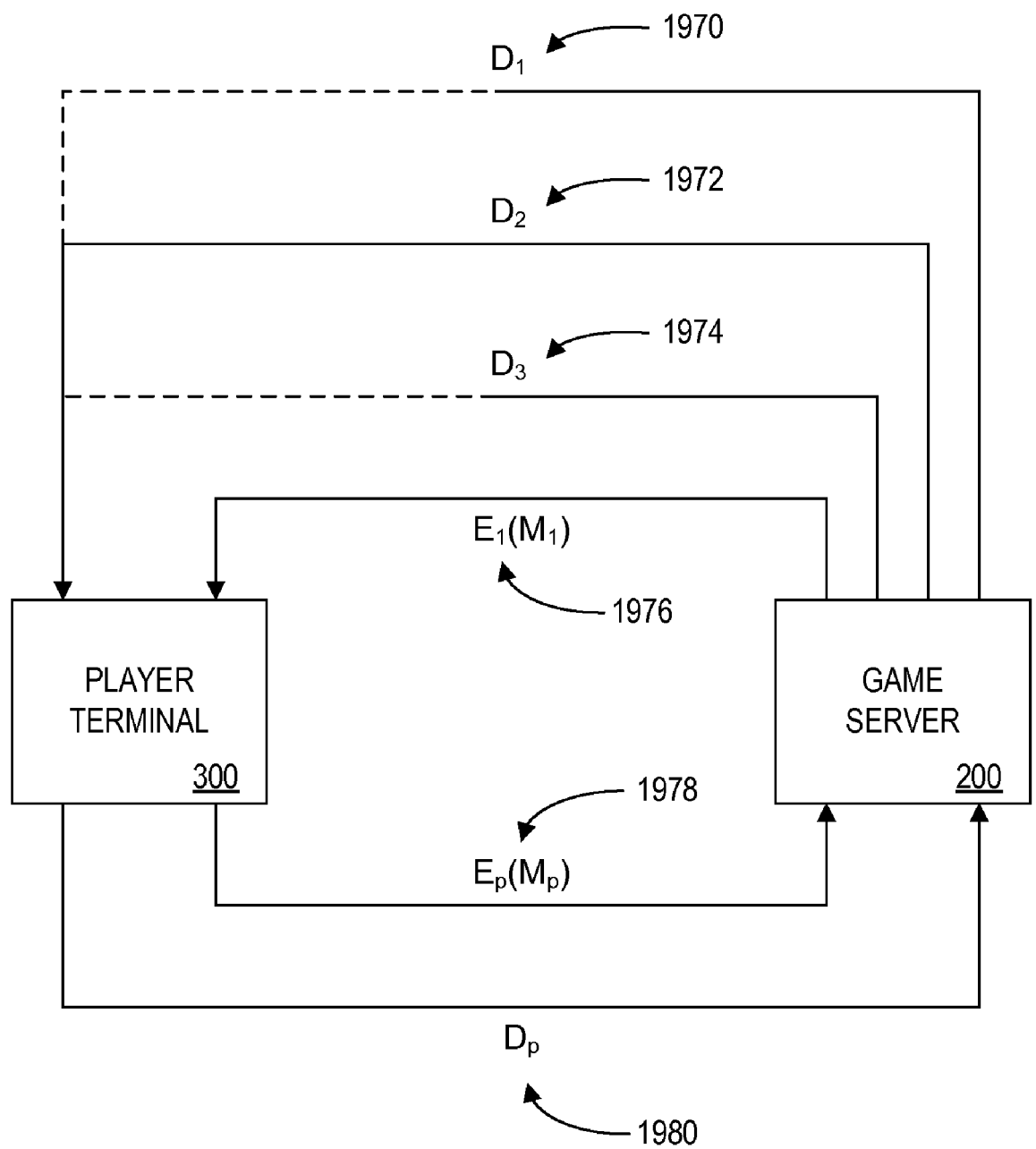
FIG. 19B is a flow diagram indicating the generation of multiple numbers by a game server.

FIG. 19B illustrates various embodiments of the present invention in flow diagram form. In FIG. 19B, game server 190 initially generates three game server decoding keys: $D_1$, $D_2$, and $D_3$ (1970, 1972, and 1974, respectively). Game server 190 ultimately transmits to the player terminal 300 an encoded version of a game server number, $E_1(M_1)$ (1976), and only one of the three game server decoding keys: $D_2$ (1972). The player terminal transmits to the game server the encoded player random number, $E_p(M_p)$ (1978), and a single decoding key $D_p$ (1980).

The exemplary attempt to cheat described above may be overcome in various ways. According to some embodiments of the present invention, when the game server, for example, transmits $E_1(M_1)$ to the player terminal, the game server may also be required to transmit the encoding key, $E_1$, to the player terminal, before the game server can know the player random number (e.g., before receiving an unencoded player random number, or before receiving a decoding key for an encoded player number received by the game server). For example, the game server may be required to transmit the encoding key, $E_1$, to the player terminal before transmitting the encoded game server number, after transmitting the encoded game server number, or along with the encoded game server number.

If the game server later transmits to the player terminal a decoding key, say $D_2$, that does not correspond to the encoding key, $E_1$, then the player will be able to determine whether he has been cheated. To determine whether the encoding key $E_1$ corresponds to the decoding key $D_2$, the player may, for example, encode a test number, M, with encoding key $E_1$, and then decode the result with decoding key $D_2$. In this example, the decoded result will not be the same as the original number, M. In other words, $D_2(E_1(M))$ does not equal M. Therefore, by having the game server transmit the encoding key $E_1$ to the player terminal before the game server knows the player random number, the game server will be motivated to transmit the proper decoding key, $D_1$, to the player terminal.

One or more embodiments of the present invention require any random numbers generated to be combined in some fashion with at least one known character, before encoding the combination. For example, suppose the game server generates a random number, 1297. The character sequence "bluesky" is then appended to the end of the number, yielding the combination, "1297bluesky". The full character sequence, "1297bluesky", is then encoded with key $E_1$ and sent to the player terminal. Now suppose the game server receives the player's encoded number and decoding key, and decides to use a number other than 1297 in the combination protocol. So the game server might attempt to use a decoding key, $D_2$, that does not match the encoding key, $E_1$. $D_2(E_1(1297bluesky))$, however, is unlikely to yield a character sequence ending in "bluesky". That is, $D_2(E_1(1297bluesky))$ does not equal "xxxxbluesky", where "xxxx" represents any set of characters. If the game server sends to the player terminal the decoding key, $D_2$, and the player decodes the game server's first transmission, $E_1(1297bluesky)$, and finds that the result does not end with "bluesky", then the player will realize he has been cheated. To cheat, the game server must determine a new decoding key that does yield a result of the form "xxxxbluesky". However, such a task may be computationally unfeasible.

Of course, in the above example, "bluesky" could be appended to the front end of the number. In some embodiments, at least one character is appended to one end of the number and at least one character is appended to the other end of the number.

Although any set of one or more characters may be used in combination with a random number, certain character sequences may be particularly convenient to use in combination with random numbers. Some of these character sequences may include, without limitation, a player's name, a player's casino card number, a date, or a time. If, for example, it is always a player's name that is appended to the game server random number, then the player does not have to find out at the beginning of a gaming session what appended character sequence to look for.

In one or more embodiments of the present invention, the set of signals that can be transmitted between the game server and the player terminal is limited. The set of signals may be limited to only one signal (e.g., "5"), to a plurality of signals (e.g., "5" and "10"), to a range of signals (e.g., 2 to 12), to particular types of signals (e.g., numbers, random numbers, alphanumeric characters, audio signals, video signals, algorithms), and may be limited by any combination of such limitations. Many other types of limitations will be known to those of skill in the art.

In one example, the player and the game server may be involved in a game of craps. To represent every possible roll of two dice, the game server and the player need only exchange integer random numbers in the range of 1 to 36, inclusively (or in the range 2 to 12, inclusive, to represent just the sum of the die faces). At the same time, the game server and the player terminal employ an encoding algorithm that is capable of handling inputs greater than 36. Therefore, if a game server encodes the number 24, for example, with the encoding key $E_1$, but later decodes the result with a decoding key, $D_2$, then the resulting number is most likely to be out of the range 1 to 36. For example, $D_2(E_1(24))$ might equal 153982. Therefore, the game server would be forced to search for a new decoding key that yielded a result between 1 and 36, a task that may be computationally unfeasible.

Those having ordinary skill in the art will understand that the various techniques described herein for circumventing or discouraging cheating (e.g., cheating in which one party derives more than one number that may be encoded to derive the same value), may be applied alternatively, or in any combination. For example, the range of random numbers may be restricted to a range, and the game server 200 may be required to transmit an encoding key to player terminal 300. Further, while such embodiments are often described herein as useful for preventing cheating by a game server 200, those having ordinary skill in the art will understand that corresponding techniques may be used, alternatively or in addition, by a game server (or by any party) to prevent cheating by a player (or by any other party).

In various embodiments of the present invention, a third party may be involved as an intermediary between the player terminal and the game server. For example, in one or more embodiments of the present invention each party submits its number, unencoded, to a third party. Once the third party receives both numbers, the third party transmits them to the player terminal and to the game server. As an extra measure of security, the player terminal and the game server may first encode their numbers before transmitting them to the third party. The third party may then transmit the encoded numbers to the player terminal and to the game server. The player terminal and the game server may then send decoding keys to the third party. Of course, a decoding key may be transmitted to the third party before the encoded random number is transmitted to the third party, or may be transmitted to the third party along with the encoded random number. After receiving the decoding keys, the third party may then transmit the decoding keys to the player terminal and to the game server. Although, the above example describes mutual encoding of numbers, those having ordinary skill in the art will understand that a third party may similarly be involved as an intermediary in various processes involving single encoding, hash values, etc.

In one or more embodiments of the present invention, the third party first transmits to the player terminal and to the game server an encoding key. The player terminal and the game server may or may not receive the same encoding key. The player terminal uses the encoding key it received from the third party to encode its random number, and may then transmit its encoded number to the game server, either directly or through the third party. Similarly, the game server uses the encoding key it received from the third party to encode its random number, and may then transmit its encoded number to the player terminal, either directly or through the third party. The third party may then transmit decoding keys to the player terminal and to the game server. The player terminal and the game server may or may not receive the same decoding key. Each party is then able to decode the other's random number, and to generate a game result using the combination protocol. Advantageously, the game server is not able to cheat by choosing which of several possible decoding keys to use. Instead, the game server must use the decoding key supplied by the third party.

In one or more embodiments, the player terminal and the game server each transmit their respective numbers, unencoded, to the third party. The third party then uses its own encoding key(s) to encode either or both of the numbers. The third party then transmits the player's number (whether unencoded or encoded) to the game server, and the game server's number (whether unencoded or encoded) to the player. If the player's number is encoded by the third party, the third party also transmits the decoding key for the player's number to the game server. Similarly, if the game server's number is encoded by the third party, the third party also transmits the decoding key for the game server's number to the player terminal. The third party may transmit a decoding key after transmitting an encoded number, before transmitting the encoded number, or along with the encoded number.

As described above, various embodiments of the present invention provide for requiring one or both of the parties to transmit its encoding key to the other party along with its encoded random number, in order to prevent cheating in which once the other party's number is known, a party can determine which of two or more generated numbers to use in the combination protocol in order to achieve a desired game result, and may transmit the corresponding decoding key.

In order to circumvent such cheating, according to one or more embodiments of the present invention, one or both parties may be required to send their encoding and/or decoding keys to a third party before knowing the other party's number. For example, the game server may be required to send its decoding key to the third party before receiving a decoded player number. Of course, the game server may alternatively send the decoding key after receiving an encoded player number, but before receiving the player decoding key (i.e., before it can decode the player number). As described herein with respect to various embodiments, one or both of the parties may also provide a decoding key to the other party. By providing encoding keys and/or decoding keys to the third party, however, if the player questions the decoding key received from the game server, for example, then the player may check with the third party and verify that the decoding key received from the game server was the same decoding key that was received by the third party before the game server knew the decoded player number. In some embodiments, the player and the game server may receive each other's decoding keys directly from the third party. The player and game server are thus prevented from choosing amongst multiple decoding keys to send to the other party.

A third party or intermediary, as described herein, may comprise one or more third parties or intermediaries. Where more than one third party is being used, each may function independently of any others. For example, to exchange numbers, a player terminal may transmit the player random number to one third party, who transmits the number to the game server. The game server may transmit the game server random number to another third party, who transmits the number to the player terminal. In some embodiments involving multiple third parties, the player terminal and/or game server may transmit to, and/or receive information from, more than one third party. For example, a player terminal may transmit the player number to one third party, who transmits the number to the game server. The player terminal may also transmit a player decoding key to another third party, who transmits the decoding key to the game server. Various embodiments of the present invention are described herein as involving an exchange of numbers between two parties, for example, a game server and a player terminal. However, a player terminal and a game server could just as easily exchange many different types of information, including, without limitation, numbers, letters, symbols, pictures, audio signals, video signals, algorithms, or any combination thereof. For example, a particular game of chance may have two possible outcomes, denoted "outcome 1" and "outcome 2". The player terminal and the game server each provide either the letter "a" or the letter "b". According to an exemplary combination protocol, if both the letters are the same, then outcome 1 occurs. If both letters are different, then outcome 2 occurs.

In one or more embodiments of the present invention, one party generates a random number, and the other party generates a function or algorithm. In an exemplary combination protocol, the function or algorithm provided by a player is applied to the random number provided by a game server to generate the result value and the game result. For example, the game server generates a number, 4. The player terminal generates an algorithm that says:

1) Multiply the game server's number by 3 to generate the number x1
2) Take x1 modulo 5 to generate the number x2
3) Add 1 to x2 to generate the result value Applying the player algorithm to the game server number, 4, yields: x1=4*3=12; x2=12 modulo 5=2; and a result value of 1+2=3. With the above exemplary algorithm, any integer generated by the game server in the range 1 to 5, inclusively, is mapped to the same range in a one-to-one fashion. That is, if the game server generates the number 1, then the result value will be 4. If the game server generates the number 2, the result value will be 2. If the game server generates the numbers 3, 4, or 5, then the result values will be 5, 3, or 1, respectively. Thus, assuming valid result values must fall in the range of 1 to 5, the above algorithm is fair in that it allows any result value in the valid range of result values to occur. Furthermore, if the game server number is generated randomly such that each integer between 1 and 5, inclusively, is equally likely to occur, then all result values will also be equally likely to occur.

In one or more embodiments of the present invention, both the game server and the player terminal generate algorithms. As will be understood by those having ordinary skill in the art, two or more algorithms may be combined in a combination protocol in a number of ways. For example, in one or more embodiments, the combination protocol specifies an input to the game server algorithm. The input may be a number, such as 14923. The game server algorithm then operates on the input to produce an output. An exemplary output of the game server algorithm might be the number 2094. According to the exemplary combination protocol, the output of the game server algorithm is then used as an input (or as one of multiple inputs) to the player algorithm. The player algorithm then operates on the output of the game server algorithm to produce its own output, which is the result value.

In the above example, as will be understood by those having ordinary skill in the art, the player algorithm could have been run before the game server algorithm (e.g., the combination protocol could have specified a first input for the player algorithm, and the output of the player algorithm could have been an input for the game server algorithm). In some embodiments, rather than having the combination protocol specify the input to the first algorithm, the player terminal or the game server might specify the input to the first algorithm. In some embodiments, the game server and the player terminal specify multiple algorithms. The algorithms may then be chained together in any order, with the output of one serving as the input for the next. Of course, as is well-known in the art, many other ways of combining algorithms are possible.

There are a number of ways in which a function or an algorithm may be represented for the purposes of transmission between the game server and the player terminal. As is well-known, a function may be represented by a set of numerals, letters, and/or symbols composing a mathematical formula. For example, $f(x)=(3x \bmod 5)+1$. In this example, x represents the input to the function. The input x may be generated randomly (e.g., by the game server). The output of the player algorithm is represented by $f(x)$, and the right side of the exemplary formula shows how to generate $f(x)$ through the operations of multiplication, modulo division, and addition.

In one or more embodiments, a function or algorithm is represented by computer program code. The code may be in any language, such as C, Java, Basic, or Fortran. The code may be written in compiled or uncompiled form. An exemplary line of code might read, "result_value=(3*input) % 5+1;". This line of code, written in C, multiplies the "input" variable by 3, takes the result modulo 5, and then adds one to generate the "result_value". There are many other well-known ways of representing a function or an algorithm using computer program code.

In one or more embodiments, a function or algorithm is represented by a table of inputs and corresponding outputs. For example, the set of inputs might be listed as: 1, 2, 3, 4, and 5. The respective outputs might be listed as: 4, 2, 5, 3, 1. Outputs may be listed in the table, for example, adjacent to their corresponding inputs.

Various embodiments described herein with respect to the exchange of numbers may also apply to an exchange involving at least one algorithm or function. According to one or more embodiments of the present invention, once a function or algorithm has been represented (e.g., in the form of text), then the representation may be encoded. The encoded function or algorithm is then given to the other party, and the other party's encoded number, function or algorithm is received. According to some embodiments, one or more decoding keys may also be exchanged.

In one or more embodiments of the present invention, a fill description or representation of an algorithm need not be transmitted to the opposite party. Instead, only particular features or elements of an algorithm need be transmitted, where the rest of the algorithm is understood by both parties. For example, an algorithm may have a fixed structure or template, but may require one or more elements be defined so that the algorithm may generate an output. In one example, an algorithm known to both parties is described by $f(x)=(??x \bmod 5)+1$, where "??" represents a multiplier value that must be defined. So, the player terminal, for example, might transmit to the game server the number, 3, whereby the game server understands that the player terminal is describing the function f(x)=(3x mod 5)+1.

Just as, in some described embodiments, the player terminal and/or game server may generate numbers randomly, in one or more embodiments the player terminal and/or game server may generate algorithms randomly. For example, a exemplary base algorithm may have a fixed structure with an undefined multiplier, as described above. The multiplier may be determined randomly, thereby generating the algorithm at random.

In one or more embodiments, a player terminal and/or a game server has multiple possible algorithms stored, for example, in a memory. The game server and/or the player may then choose one of the pre-existing algorithms at random, and transmit the algorithm to the other party.

In one or more embodiments of the present invention, the player and/or the game server represent a function as a table. All possible inputs are listed, for example, in one column of the table. All possible outputs are then ordered at random, and preferably located in an adjacent column of the table. Accordingly, any input may be referenced in the first column, and will yield a random output listed adjacently in the second column. Outputs may or may not be listed multiple times, depending on the desired probability of occurrence of the output. As an example, a function has five possible inputs: 1, 2, 3, 4, or 5, and five possible outputs, also: 1, 2, 3, 4, or 5. To create a random function, the game server lists the possible inputs in order: 1, 2, 3, 4, and 5, in a column. The game server then selects a random arrangement of the outputs, here: 3, 5, 2, 1, 4. Then, the outputs are preferably listed in a column adjacent to the inputs. Thus, an input of 1 would yield an output of 3, an input of 2 would yield an output of 5, and so on.

There are many other well-known methods for generating algorithms randomly; others will be apparent to those having ordinary skill in the art.

Even if a party is confident that two numbers being used in a combination protocol are generated independently of one another, the party may want to ascertain a level of fairness of the combination protocol itself. For example, a combination protocol being used in a game, although known to both parties, may have been generated by one party. Accordingly, the other party might want to verify that the combination protocol is fair. If a party is able to determine that a combination protocol meets some criterion for fairness, that party may be more willing to engage in a game.

One or more embodiments of the present invention provide for determining a level of fairness of a combination protocol. One possible criterion for a fair combination protocol is that it does not allow either the player or the game server to unilaterally change the probability of occurrence of a particular result value. For example, suppose the game server wished for a result value of 200. With a fair combination protocol, the game server should not be able to choose a game server number such that the result value of 200 is any more likely than if the game server had chosen the game server number at random. An exemplary fair combination protocol would receive a player number and a game server number, each an integer between 1 and 1000, inclusively. The protocol would then add the two integers, take the result modulo 1000, and add 1. Therefore, the result value would be an integer between 1 and 1000. Suppose that, using this combination protocol, the game server and the player terminal each chose their respective numbers at random, with each integer between 1 and 1000, inclusively, being equally likely. The player number will be denoted $x_p$, and the game server random number $x_g$. The probability mass function for $x_p$ is then given by $p[x_p] = 1/1000 u[x_p-1] u[-x_p+1000]$. Note that the square brackets denote a discrete function, one that is defined only over the set of integers. Also, u[n] is the unit step function, defined to be zero for n<0, and 1 for n>=0. The probability mass function for $x_g$ is the same as that for $x_p$. The sum of the player and the game server's random numbers will be denoted y, where $y=x_p+x_g$. The probability mass function for the sum of the player number and game server number is obtained by taking the convolution of the individual probability mass functions. Thus, $$p[y] = p[x_p] * p[x_g]$$
$$= \sum_{k=-\infty \ldots \infty} 1/1000 u[k-1] u[-k+1000] 1/1000 u[y-k-1]$$
$$u[-(y-k)+1000]$$
$$= (y-1)(10^{-6}) u[y-1] u[-y+1001] +$$
$$(-y+2001)(10^{-6}) u[y-1002] u[-y+2000]$$

Here, the symbol "*" denotes convolution. Now let z=y modulo 1000. The probability mass function for z can be obtained by adding the probability mass function for y in the range 0<=y<=999, the probability mass function for y in the range 1000<=y<=1999 shifted to the left by 1000, and the probability mass function for y in the range 2000<=y<=2999 shifted to the left by 2000. Thus, $$p[z] = ((z-1)(10^{-6}) u[z-1] u[-z+1001] +$$
$$(-z+2001)(10^{-6}) u[z-1002] u[-z+2000] +$$
$$(z+1000-1)(10^{-6}) u[z+1000-1] u[-(z+1000)+1001] +$$
$$(-(z+1000)+2001)(10^{-6}) u[(z+1000)-1002]$$
$$u[-(z+1000)+2000] +$$
$$(z+2000-1)(10^{-6}) u[z+2000-1] u[-(z+2000)+1001] +$$
$$(-(z+2000)+2001)(10^{-6}) u[(z+2000)-1002]$$
$$u[-(z+2000)+2000]) u[z] u[-z+999]$$
$$= ((z-1)(10^{-6}) u[z-1] u[-z+1001] +$$
$$(-z+2001)(10^{-6}) u[z-1002] u[-z+2000] +$$
$$(z+999)(10^{-6}) u[z+999] u[-z+1] +$$
$$(-z+1001)(10^{-6}) u[z-2] u[-z+1000] +$$
$$(z+1999)(10^{-6}) u[z+1999] u[-z-999] +$$
$$(-z+1)(10^{-6}) u[z+998] u[-z]) u[z] u[-z+999]$$
$$= (z-1)(10^{-6}) u[z-1] u[-z+999] +$$
$$(z+999)(10^{-6})(\delta[z] + \delta[z-1]) +$$
$$(-z+1001)(10^{-6}) u[z-2] u[-z+999] + (-z+1)(10^{-6})(\delta[z])$$
$$= (10^{-6})(((z-1) + (-z+1001)) u[z-2] u[-z+999] +$$
$$(z+999)(\delta[z] + \delta[z-1]) + (-z+1)(\delta[z]))$$
$$= (10^{-6})(1000 u[z-2] u[-z+999] + 999\delta[z] +$$
$$1000\delta[z-1]) + \delta[z]))$$
$$= 1/1000 u[z] u[-z+999]$$

Where $\delta[n]$ is the unit impulse function, defined to be 1 for n=0 and 0 everywhere else. Finally, 1 is added to z to complete the combination protocol, yielding:

$$p[\text{result value}] = \frac{1}{1000} u[\text{result value}-1]u[-\text{result value}+1000]$$

As is evident, if the player terminal chooses an integer in the range 1 to 1000, with each integer occurring with equal likelihood, and the game server does the same, then each result value will occur with equal likelihood.

In this next example, the game server chooses the game server random number in such a way that some game server random numbers are more likely to occur than others. Perhaps the game server is attempting to unduly influence the result value. In this example, the game server will choose the number 1 with probability $a_1$, the number 2 with probability $a_2$, and so on. Note that $a_1+a_2+a_3+\ldots+a_{1000}=1$, since the game server is required to choose an integer between 1 and 1000, inclusively. Furthermore, all a's are between zero and 1, inclusively, since they represent probabilities. If, for instance, $a_2=1$, then the game server will choose the number 2 with certainty, and there is actually no randomness at all in the game server's choice. Now, the probability mass function for the game server random number can be written:

$$p[x_g] = a_1\delta[x_g-1] + a_2\delta[x_g-2] + \ldots + a_{1000}\delta[x_g-1000]$$

$$= \sum_{k=1\ldots1000} a_k\delta[x_g-k]$$

Meanwhile, the player terminal chooses its number at random. Thus, the probability mass function for the player number remains: $p[x_p] = \frac{1}{1000}u[x_p-1]u[-x_p+1000]$. The combination protocol now proceeds by taking $y = X_p + x_g$. Once again $$p[y] = p[x_p] * p[x_g]$$

$$= p[x_p] * \sum_{k=1\ldots1000} a_k\delta[x_g-k]$$

$$= \sum_{k=1\ldots1000} p[x_p] * a_k\delta[x_g-k]$$

$$= \sum_{k=1\ldots1000} (1/1000\, u[x_p-1]u[-x_p+1000]) * a_k\delta[x_g-k]$$

$$= 1/1000 \sum_{k=1\ldots1000} a_k u[y-k-1]u[-(y-k)+1000]$$

$$= 1/1000 \sum_{k=1\ldots1000} a_k u[y-k-1]u[-y+k+1000]$$

Once again, let $z = y \bmod 1000$. Now, $$p[z] = 1/1000 \sum_{k=1\ldots1000} (a_k u[z-k-1]u[-z+k+1000] +$$

$$a_k u[(z+1000)-k-1]u[-(z+1000)+k+1000] +$$

$$a_k u[(z+2000)-k-1]u[-(z+2000)+k+1000])u[z]u[-z+999]$$

$$= 1/1000 \sum_{k=1\ldots1000} (a_k u[z-k-1]u[-z+k+1000] +$$

$$a_k u[z-k+999]u[-z+k] +$$

$$a_k u[z-k+1999]u[-z+k-1000])u[z]u[-z+999]$$

$$= 1/1000 \sum_{k=1\ldots1000} (a_k u[z-k+1999]u[-z+k+$$

$$1000])u[z]u[-z+999]$$

$$= 1/1000 \sum_{k=1\ldots1000} a_k u[z]u[-z+999]$$

$$= 1/1000\, u[z]u[-z+999] \sum_{k=1\ldots1000} a_k$$

$$= 1/1000\, u[z]u[-z+999]$$

Finally, 1 is added to z to complete the combination protocol, yielding:

$$p[\text{result value}] = \frac{1}{1000} u[\text{result value}-1]u[-\text{result value}+1000]$$

Once again, it is evident that all result values are equally likely to occur. This, despite the fact that the game server was attempting to influence the result value by more heavily favoring some potential game server numbers over others. However, since the player terminal did not favor one particular player number over another, all result values were still equally likely to occur. Note that the above analysis requires that the game server number and the player number be generated independently. If the numbers are not generated independently, than both may have uniform probability mass functions over the closed interval 1 to 1000, and yet their sum might be deterministic. For example, the game server may generate it's number randomly, and then the player terminal may generate its number according to the rule; $x_p = 1001 - x_g$. Then the sum of the player number and the game server number will always be 1001.

The above analysis has shown that, according to at least one criterion, the analyzed combination protocol is fair. That is, one party cannot change the probability of the occurrence of any result value, so long as the other party generates his number at random and according to a uniform probability mass function over a particular interval. The analysis could easily be extended to show that any combination protocol that 1) Adds a player and game server random number, each restricted to a designated continuous interval, to generate a number y;
2) Takes y modulo the length of the interval to generate a number z; and
3) And adds a constant to obtain the result value such that the result value is certain to fall within the designated interval;

is a fair protocol according to the at least one criterion.

An example of an unfair combination protocol might be the following:

1) The player terminal and the game server each generate a number that is an integer between 1 and 500, inclusively; and
2) The combination protocol adds the numbers together to get the result value. The result value is to fall within the range 2 to 1000.

With the above protocol, the game server might choose the number 499. Now, no matter what the player terminal chooses, the result value cannot be 1000. This is because the player terminal is restricted to choosing numbers in the range 1 to 500. Choosing the maximum number in the range would only give a result value of 999, one short of 1000. Furthermore, no matter what the player terminal chooses, the result value cannot be a number less than 500. So by purposely choosing a particular number, the game server can assure that certain result values cannot occur. Perhaps the result value of 1000 corresponds to a high paying symbol combination in a game of slots. The player is then denied the opportunity to achieve this payout.

A typical combination protocol may be more complicated than those analyzed above. As such, the fairness of the protocol may not necessarily be determinable through a simple analysis. One way for, say, a player terminal to verify the fairness of a combination protocol algorithm would be to run the algorithm using all possible combinations of inputs (i.e. all possible combinations of player and game server numbers). The player terminal could check that given a particular game server random number all possible result values might still occur. The player terminal might further verify that a for a particular result value, $rv_0$, and any two game server numbers $x_{g1}$ and $x_{g2}$, the chances of $rv_0$ occurring given $x_{g1}$ are the same as the chances of $rv_0$ occurring given $x_{g2}$. This may assume that the player himself generates the player number at random, with all numbers equally favored probabilistically.

Another method of verifying that a combination protocol algorithm is fair would be for a player to run the algorithm many times with a random player number and a fixed game server number. The player would then check to see whether or not particular result values were unduly favored or disfavored. If, for example, a player ran the combination protocol many times with a fixed game server number and a random player number, and found that a particular result value never occurred, then the player might determine that the combination protocol is unfair. This method of verification may be used right after the completion of a game, such as a spin at a slot machine. Perhaps the player has lost the game and is suspicious that he has been cheated due to an unfair combination protocol. So the player tests the game server random number from the game with numerous possible player numbers. The test should show the player what might have happened had the player chosen a different player number in the game. If it turns out that no player number would have resulted in a favorable result value for the player, then the player has confirmed the unfairness of the combination protocol One or more embodiments of the present invention provide for evaluating the fairness of a combination protocol by determining a set of at least one generated game outcome as described above and determining a relative frequency which a particular game outcome occurs in the set of at least one generated game outcome. A probability of that particular game outcome occurring in a fair game (e.g., a game in which one of the parties cannot inappropriately influence the outcome and/or the random process used to determine an outcome) may also be determined. Then, a level of fairness of the combination protocol can be determined based on the probability of the outcome occurring in a fair game and the relative frequency of representation. For example, the probability and the relative frequency of representation can be compared. If there is a difference between the relative frequency in the generated outcomes and the probability of the outcome occurring in a "pure" game, the level of fairness may depend on the difference. Any difference, for example, may be compared to a predetermined allowable difference. It will be understood that the probability and the relative frequency need not be exactly the same, but may vary by an allowable margin.

Various levels of fairness may correspond to how much the relative frequency and the probability vary. For example, a slight difference may correspond to a fairness of "Very Fair", and a larger difference may correspond to a fairness level of "Unfair."

For example, a player is to test a combination protocol for fairness using a fixed number (e.g., a game server number) and each of a set of one or more possible player numbers. To determine a set of possible player numbers to use, a given set may be compared with one or more various criteria, to determine whether the set of player numbers, if tested, would provide the predetermined degree of confidence that the combination protocol is fair.

An evaluation of the fairness of a combination protocol preferably includes a sufficient number of tests so that the failure of the appearance of the predetermined game outcome the predetermined number of times would most likely indicate the unfairness of the combination protocol. Otherwise, the failure to generate certain result values and/or outcomes during analysis of a combination protocol might be explained by the lack of a sufficient number of tests of the combination protocol, and not necessarily by the unfairness of the combination protocol itself.

Accordingly, one criterion for selecting a set of player numbers to test with may be that the number of elements in the set of player numbers is not less than some threshold or predetermined minimum number of elements.

Similarly, another criterion for the set of player numbers tested might by that the number of elements in the set of player numbers is not less than a predetermined minimum percentage (e.g., 10%, 100%) of the number of all allowed player numbers. Again, this criterion might help to ensure that the failure of a test to generate a particular result value and/or outcome tests is most likely due to the unfairness of the combination protocol, and not to the lack of a sufficient number of tests conducted.

Another possible criterion for the set of player numbers tested might be that the number of elements in the set of player numbers is sufficient such that, if each player number tested leads to a corresponding game outcome, then the number of elements in the set of player numbers will ensure, with a predetermined probability, at least a predetermined number of occurrences of a particular game outcome.

Further criteria might require that the player numbers in the set of player numbers tested must all be distinct, and/or that each of the player numbers must be selected at random from among all allowed player numbers.

Many other such criteria for the set of player numbers to be tested will be obvious to those having ordinary skill in the art.

Although several methods of verifying the fairness of a combination protocol have been described, many other methods are possible. Methods for verifying the fairness of a combination protocol may also be used to verify the fairness of a player or game server algorithm in embodiments where the player and the game server exchange algorithms rather than numbers.

Various embodiments of the present invention are directed to systems and methods for ensuring the randomness of random numbers. One or more embodiments of the present invention provide for authenticating the results of electronic games in a manner that substantially obviates one or more of various limitations and disadvantages of the related art. Various embodiments of the present invention provide, in an electronic game system, hardware and procedures to ensure that random numbers used to generate game results are truly random, independently-generated numbers.

In accordance with one or more embodiments of the present invention, an electronic game system comprises a game server and one or more player terminals. The game server includes a random number generator and a first transmitting device for transmitting a first random number to the one or more player terminals. The one or more player terminals includes a random number generator and a second transmitting device for transmitting a second random number to the game server. The system also includes one or more of various hardware and/or procedures for ensuring that the first random number is generated independently of the second random number.

One or more embodiments of the present invention provide for a method for controlling an electronic game played in a system that includes a game server and one or more player terminals. The method includes the steps of generating a first random number at the game server; generating a second random number at the player terminal; encoding the first random number at the game server; encoding the second random number at the player terminal; transmitting a player encoded number from the player terminal to the game server; transmitting a player decoding key from the player terminal to the game server; and decoding the player encoded number at the game server to obtain the second random number.

According to various embodiments of the present invention, a result value is generated based on the first random number and the second random number. Some embodiments of the present invention provide for producing a game result based on the result value.

Some embodiments of the present invention are directed to various systems and procedures of a game server separate from a player terminal, as well as various combinations of such systems and/or procedures. Some embodiments of the present invention are directed to various systems and procedures of a player terminal separate from a game server, as well as various combinations of such systems and/or procedures. As discussed above, other embodiments may provide for one or more systems and/or procedures of a game server in various combinations with one or more systems and/or procedures of a player terminal.

One or more embodiments of the present invention provide for various hardware and/or procedures for encoding, hashing, encrypting, decoding, dehashing, and decrypting the first and second random numbers. Moreover, one or more embodiments of the systems and procedures of the present invention provide for authenticating players. One or more embodiments of the present invention provide for creating audit records of game data.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

Respective objects and advantages of various embodiments of the invention will be obvious from the description, or may be learned by practice of the invention. It is to be understood that descriptions provided herein are exemplary and explanatory only, and are not restrictive of the invention, as claimed.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments failing within the scope of the appended claims.

What is claimed is:

1. A method of facilitating electronic game play, comprising:
   receiving, by a game server, a selection of a game and an encoded player number from a player, the encoded player number associated with a random component of the selected game;
   generating, by a game server, a game server random number;
   transmitting the game server random number to the player;
   receiving, by a game server, a decoding key from the player;
   decoding the encoded player number with the decoding key to determine a player number; and
   generating, by a game server, a result value corresponding to the random component of the selected game, the result value based on the player number and the game server random number.

2. The method of claim 1, further comprising transmitting, by a game server, the result value to the player.

3. The method of claim 1, further comprising receiving, by a game server, an indication of a wager from the player prior to receiving the decoding key.

4. The method of claim 3, wherein the wager is subject to at least one rule for placing wagers.

5. The method of claim 1, further comprising:
   determining, by a game server, that the result value corresponds to a winning game outcome; and
   providing, by a game server, the result value and a prize to the player.

6. The method of claim 1, further comprising:
   utilizing the result value, by a game server, to select an available outcome associated with the selected game, and
   transmitting, by a game server, the available outcome to the player.

7. The method of claim 6, wherein the available outcome corresponds to at least one of a letter, a number and a card.

8. The method of claim 6, further comprising:
   determining, by a game server, that the available outcome corresponds to a winning game outcome; and
   providing a prize to the player.

9. The method of claim 1, further comprising:
   receiving an indication of a wager, by a game server, from the player prior to receiving the decoding key;
   selecting, by a game server, an available outcome based on the result value, the available outcome associated with the selected game;
   determining, by a game server, that the available outcome corresponds to a winning game outcome; and
   providing the available outcome and a prize to the player based on the wager.

10. The method of claim 9, wherein the available outcome corresponds to at least one of a letter, a number and a card.

11. The method of claim 9, wherein the wager is subject to at least one rule for placing wagers.

12. The method of claim 1, wherein the selected game is a game of skill that comprises at least one random component.

13. The method of claim 1, further comprising:
   receiving, by a game server, a second encoded player number from the player, the second encoded player number corresponding to a second random component that is associated with the selected game;
   generating, by a game server, a second game server random number;
   transmitting, by a game server, the second game server random number to the player;

receiving a second decoding key from the player;
decoding the second encoded player number with the second decoding key to determine a second player number; and
generating, by a game server, a second result value corresponding to the second random component of the selected game, the second result value based on the second player number and the second game server random number.

14. The method of claim 13, further comprising:
receiving an indication of a wager, by a game server, from the player prior to receiving the second decoding key;
selecting, by a game server, a first available outcome corresponding to the result value and a second available outcome corresponding to the second result value;
determining, by a game server, that the first available outcome and the second available outcome correspond to a winning game outcome; and
providing the first available outcome, the second available outcome, and a prize to the player based on the wager.

15. The method of claim 1, in which generating the result value comprises utilizing a combination protocol to transform the player number and the game server random number into the result value.

16. The method of claim 1, in which receiving the game selection further comprises receiving at least one of a player ID number and a tracking number.

17. The method of claim 1, wherein the encoded player number comprises an encoded random number.

18. The method of claim 1, further comprising, prior to transmitting the game server random number, encoding, by a game server, the game server random number.

19. The method of claim 18, in which receiving the decoding key from the player comprises receiving a wager from the player, and further comprising transmitting a game server random number key to the player.

20. The method of claim 1, wherein receiving the selection of a game and the encoded player number further comprises receiving at least one of numbers, letters, symbols, pictures, audio signals, video signals, or algorithms.

21. The method of claim 1, in which generating a result value comprises generating multiple result values corresponding to the game component of the selected game, the multiple result values based on the player number and the game server random number.

22. The method of claim 21, in which generating multiple result values comprises utilizing a combination protocol to transform the player number and the game server random number into multiple result values.

23. The method of claim 21, further comprising:
determining, by a game server, that the multiple result values correspond to a winning game outcome; and
providing a prize to the player.

24. The method of claim 21, further comprising transmitting, by a game server, the multiple result values to the player.

25. The method of claim 24, wherein the multiple result values represent at least one of spins of a roulette wheel, rolls of dice, or cards drawn for a card game.

26. A computer readable medium storing instructions configured to direct a processor to:
receive a selection of a game and an encoded player number from a player, the encoded player number associated with a random component of the selected game;
generate a game server random number;
transmit the game server random number to the player;
receive a decoding key from the player;
decode the encoded player number with the decoding key to determine a player number; and
generate a result value corresponding to the random component of the selected game, the result value based on the player number and the game server random number.

27. The computer readable medium of claim 26, which further comprises instructions configured to direct the processor to transmit the result value to the player.

28. The computer readable medium of claim 26, which further comprises instructions configured to direct the processor to receive a wager from the player prior to receiving the decoding key.

29. The computer readable medium of claim 28, in which the instructions for receiving the wager further comprise instructions configured to direct the processor to receive at least one rule for placing the wager.

30. The computer readable medium of claim 26, which further comprises instructions configured to direct the processor to:
determine that the result value corresponds to a winning game outcome; and
transmit an indication of the result value, the winning game outcome, and an indication of a prize to the player.

31. The computer readable medium of claim 26, which further comprises instructions configured to direct the processor to:
utilize the result value to select an available outcome associated with the selected game; and
transmit the available outcome to the player.

32. The computer readable medium of claim 31, in which the instructions for transmitting the available outcome comprise instructions configured to direct the processor to transmit an indication of at least one of a letter, a number and a card.

33. The computer readable medium of claim 31, in which the instructions for transmitting the available outcome comprise instructions configured to direct the processor to:
determine that the available outcome corresponds to a winning game outcome; and
transmit an indication of the winning game outcome, and an indication of a prize to the player.

34. The computer readable medium of claim 26, which further comprises instructions configured to direct the processor to:
receive a wager from the player prior to receiving the decoding key;
select an available outcome based on the result value, the available outcome associated with the selected game;
determine that the available outcome corresponds to a winning game outcome; and
transmit the winning game outcome and an indication of a prize to the player based on the wager.

35. The computer readable medium of claim 34, in which the instructions for transmitting the winning game outcome comprise instructions configured to direct the processor to transmit an indication of at least one of a letter, a number and a card.

36. The computer readable medium of claim 34, in which the instructions for receiving a wager comprise instructions configured to direct the processor to enforce at least one rule for placing the wager.

37. The computer readable medium of claim 26, which further comprises instructions configured to direct the processor to:
receive a second encoded player number from the player, the second encoded player number corresponding to a second random component of the selected game;

generate a second game server random number;
transmit the second game server random number to the player;
receive a second decoding key from the player;
decode the second encoded player number with the second decoding key to determine a second player number; and
generate a second result value corresponding to the second random component of the selected game, the second result value based on the second player number and the second game server random number.

38. The computer readable medium of claim 37, which further comprises instructions configured to direct the processor to:
receive a wager from the player prior to receiving the second decoding key;
select a first available outcome corresponding to the result value and a second available outcome corresponding to the second result value;
determine that the first available outcome and the second available outcome correspond to a winning game outcome; and
transmit an indication of the first available outcome, the second available outcome, and a prize to the player based on the wager.

39. The computer readable medium of claim 26, in which the instructions for generating the result value comprise instructions configured to direct the processor to utilize a combination protocol to transform the player number and the game server random number into the result value.

40. The computer readable medium of claim 26, in which the instructions for receiving the game selection comprise instructions configured to direct the processor to receive at least one of a player ID number and a tracking number.

41. The computer readable medium of claim 26, which further comprises instructions configured to direct the processor to, prior to transmitting the game server random number, encode the game server random number.

42. The computer readable medium of claim 41, in which the instructions for receiving the decoding key from the player comprise instructions configured to direct the processor to:
receive a wager from the player; and
transmit a game server random number key to the player.

43. The computer readable medium of claim 26, in which the instructions for receiving the selection of a game and the encoded player number comprise instructions configured to direct the processor to receive at least one of numbers, letters, symbols, pictures, audio signals, video signals, or algorithms.

44. The computer readable medium of claim 26, in which generating a result value comprises instructions configured to direct the processor to generate multiple result values corresponding to the random component of the selected game, the multiple result values based on the player number and the game server random number.

45. The computer readable medium of claim 44, in which the instructions for generating multiple result values comprise instructions configured to direct the processor to utilize a combination protocol to transform the player number and the game server random number into multiple result values.

46. The computer readable medium of claim 44, which further comprises instructions configured to direct the processor to:
determine that the multiple result values correspond to a winning game outcome; and
transmit an indication of the winning game outcome to the player.

47. The computer readable medium of claim 44, which further comprises instructions configured to direct the processor to transmit the multiple result values to the player.

48. The computer readable medium of claim 47, in which the instructions for transmitting the multiple result values further comprise instructions configured to direct the processor to transmit an indication of at least one of spins of a roulette wheel, rolls of dice, or cards drawn for a card game.

49. The computer readable medium of claim 26, in which the instructions for generating the multiple result values further comprise instructions configured to direct the processor to utilize at least one combination protocol to transform the player number and the game server random number into the multiple result values.

50. An apparatus, comprising:
a processor; and
a storage device operatively coupled to the processor and storing instructions adapted to be executed by the processor to:
receive a selection of a game and an encoded player number from a player, the encoded player number associated with a random component of the selected game;
generate a game server random number;
transmit the game server random number to the player;
receive a decoding key from the player;
decode the encoded player number with the decoding key to determine a player number; and
generate at least one result value corresponding to the random component of the selected game, the at least one result value based on the player number and the game server random number.

51. A method of facilitating electronic game play, comprising:
receiving, by a game server, a selection of a game and encoded player numbers corresponding to at least two players, the encoded player numbers associated with a random component of the selected game;
generating, by a game server, a game server random number;
transmitting the game server random number to the players;
receiving, by a game server, decoding keys from the players;
decoding the encoded player numbers with the decoding keys to determine corresponding player numbers; and
generating, by a game server, a communal result value corresponding to the random component of the selected game, the communal result value based on the player numbers and the game server random number.

52. The method of claim 51, further comprising:
receiving, by a game server prior to receiving the decoding keys, an indication of wagers from each of the players;
determining, by a game server, that the communal result value corresponds to a winning game outcome for at least one player; and
providing a prize to the at least one player based on the wager placed by the at least one player.

53. The method of claim 51, wherein the encoded player numbers are random numbers that have been generated by each of the players and encoded.

54. The method of claim 51, further comprising transmitting the communal result value to each of the players.

55. The method of claim 54, further comprising enabling the players to verify the communal result value by permitting the players to exchange the decoded player numbers with each other and to compare them with the game server random number.

56. The method of claim 51, wherein the communal result value represent at least one of a spin of a roulette wheel, a roll of dice, or a card drawn for a card game.

57. The method of claim 51, wherein the selected game is a game of skill that comprises at least one random component.

58. The method of claim 51, in which generating the communal result value comprises utilizing at least one combination protocol to transform the player numbers and the game server random number into the communal result value.

59. The method of claim 51, in which receiving the game selection further comprises receiving at least one of a player ID number and a tracking number.

60. The method of claim 51, wherein the encoded player number comprises an encoded random number.

61. The method of claim 51, wherein receiving a game selection and the encoded player numbers further comprises receiving at least one of numbers, letters, symbols, pictures, audio signals, video signals, or algorithms.

62. The method of claim 51, further comprising, prior to transmitting the game server random number, the game server encoding the game server random number.

63. The method of claim 62, in which receiving the decoding keys from the players comprises receiving an indication of wagers from the players, and further comprising transmitting, by a game server, a game server random number key to the players.

64. A computer readable medium storing instructions configured to direct a processor to:
   receive a selection of a game and encoded player numbers corresponding to at least two players, the encoded player numbers associated with a random component of the selected game;
   generate a game server random number;
   transmit the game server random number to the players;
   receive decoding keys from the players;
   decode the encoded player numbers with the decoding keys to determine corresponding player numbers; and
   generate a communal result value corresponding to the random component of the selected game, the communal result value based on the player numbers and the game server random number.

65. The computer readable medium of claim 64, which further comprises instructions configured to direct the processor to:
   receive, prior to receiving the decoding keys, wagers from each of the players;
   determine that the communal result value corresponds to a winning game outcome for at least one player; and
   transmit an indication of a prize to the at least one player based on the wager placed by the at least one player.

66. The computer readable medium of claim 64, further comprising instructions for directing the processor to transmit the communal result value to each of the players.

67. The computer readable medium of claim 65, in which the instructions for transmitting the communal result value comprise instructions configured to direct the processor to transmit at least one of a spin of a roulette wheel, a roll of dice, or a card drawn for a card game.

68. The computer readable medium of claim 66, which further comprises instructions configured to direct the processor to facilitate the exchange of the decoded player numbers between the players so that the players can verify the communal result value by comparison with the game server random number.

69. The computer readable medium of claim 64, in which the instructions for generating the communal result value comprise instructions configured to direct the processor to utilize at least one combination protocol to transform the player numbers and the game server random number into the communal result value.

70. The computer readable medium of claim 64, in which the instructions for receiving the game selection comprise instructions configured to direct the processor to receive at least one of a player ID number and a tracking number.

71. The computer readable medium of claim 64, in which the instructions for receiving a game selection and the encoded player numbers comprise instructions configured to direct the processor to receive at least one of numbers, letters, symbols, pictures, audio signals, video signals, or algorithms.

72. The computer readable medium of claim 64, which further comprises instructions configured to direct the processor to, prior to transmitting the game server random number, encoding the game server random number.

73. The computer readable medium of claim 64, in which the instructions for receiving the decoding keys from the players comprise instructions configured to direct the processor to receive wagers from the players, and further comprise instructions configured to direct the processor to transmit a game server random number key to the players.

74. An apparatus, comprising:
   a processor; and
   a storage device operatively coupled to the processor and storing instructions adapted to be executed by the processor to:
      receive a selection of a game and encoded player numbers corresponding to at least two players, the encoded player numbers associated with a random component of the selected game;
      generate a game server random number;
      transmit the game server random number to the players;
      receive decoding keys from the players;
      decode the encoded player numbers with the decoding keys to determine corresponding player numbers; and
      generate a communal result value corresponding to the random component of the selected game, the communal result value based on the player numbers and the game server random number.

* * * * *